United States Patent
Nishio et al.

[11] Patent Number: 6,128,822
[45] Date of Patent: Oct. 10, 2000

[54] METHOD FOR REPAIR AND/OR REINFORCEMENT OF PARTITION-TYPE HEAT EXCHANGER

[75] Inventors: Hiroaki Nishio; Akira Kato, both of Yokohama, Japan

[73] Assignee: NKK Corporation, Tokyo, Japan

[21] Appl. No.: 09/155,832

[22] PCT Filed: Feb. 7, 1997

[86] PCT No.: PCT/JP97/00311

§ 371 Date: Oct. 6, 1998

§ 102(e) Date: Oct. 6, 1998

[87] PCT Pub. No.: WO98/34997

PCT Pub. Date: Aug. 13, 1998

[51] Int. Cl.$^7$ .................................................. B23P 15/26
[52] U.S. Cl. .................... 29/890.031; 29/402.18
[58] Field of Search .................. 29/890.031, 402.19, 29/402.18; 228/119

[56] References Cited

U.S. PATENT DOCUMENTS

| | | | |
|---|---|---|---|
| 3,816,289 | 6/1974 | Landauer et al. | 204/181 |
| 4,298,378 | 11/1981 | Murakami . | |
| 4,410,167 | 10/1983 | Murakami | 266/281 |
| 4,574,035 | 3/1986 | Highley et al. | 202/242 |
| 4,577,385 | 3/1986 | Omae et al. | 29/402.18 |
| 4,677,757 | 7/1987 | Debenham et al. | 34/4 |
| 4,946,806 | 8/1990 | Willard | 501/88 |
| 5,013,499 | 5/1991 | Willard | 264/30 |
| 5,061,527 | 10/1991 | Watanabe et al. | 427/423 |
| 5,128,075 | 7/1992 | Robyn et al. | 264/30 |

FOREIGN PATENT DOCUMENTS

| | | |
|---|---|---|
| 52-91001 | 8/1977 | Japan . |
| 62-15508 | 4/1987 | Japan . |
| 3-9185B | 2/1991 | Japan . |
| 5-132355 | 5/1993 | Japan . |
| 9-71781A | 3/1997 | Japan . |

OTHER PUBLICATIONS

B. Bliem et al, "Ceramic Heat Exchanger Concepts and Materials Technology", Noyes Publications, p. 14 (1985).

*Primary Examiner*—Irene Cuda
*Attorney, Agent, or Firm*—Frishauf, Holtz, Goodman, Langer & Chick, P.C.

[57] ABSTRACT

A method for repairing and/or reinforcing a bulkhead for a bulkhead type heat exchanger having a bulkhead formed of a permeable material comprising the steps of supplying a gas (G-1) containing a metal and/or a metallic compound to one side of the bulkhead, supplying to the other side thereof another gas (G-2) containing a reaction gas adapted to react with a metal and/or a metallic compound to deposit a solid metallic compound said gas (G-1) and said another gas (G-2) being caused to reach the inside of the bulkhead, and then causing said gas (G-1) to react with said another gas (G-2) so as to deposit a solid metallic compound inside the bulkhead, thereby repairing and/or reinforcing the bulkhead of the bulkhead type heat exchanger.

27 Claims, 9 Drawing Sheets

(a)

(b)

METHOD FOR REPAIR AND/OR REINFORCEMENT OF PARTITION-TYPE HEAT EXCHANGER

FIELD OF THE INVENTION

The present invention relates to a method for repair and/or reinforcement of a partition of a partition-type heat exchanger.

BACKGROUND OF THE INVENTION

There is conventionally known a partition-type heat exchanger having an object to apply a treatment such as heating of an object to be heated, phase transformation or a reaction by arranging a heating gas on one side of the partition and the object to be heated on the other side, and causing the heat from the heating gas to transfer through the partition to the object to be heated.

For example, the "CERAMIC HEAT EXCHANGER CONCEPTS AND TECHNOLOGY", (NOYES PUBLICATIONS, 1985) discloses various partition-type heat exchangers for heat exchange between gases (hereinafter referred to as the "prior art 1"). More specifically, a partition-type heat exchanger disclosed in the prior art 1, is of the finned plate type, the tube in shell type, the tube in tube type or the helical type in terms of the structure, and the material of the partition comprises codielite ($2MgO/2Al_2O_3/5SiO_2$), magnesia-alumina silicate and silicon carbide. Such a ceramic partition suffers from quality deterioration during a long-term use, leading to occurrence of cracks. Further, when cracks grow into through-cracks, a gas on the high-pressure side leaks through the partition to the low-pressure side, thus making the partition inapplicable. The prior art 1 describes no method for repairing through-cracks occurring in the partition. In the aforementioned heat exchanger, therefore, a damaged partition is conjectured to be abandoned.

A coke oven is a furnace for manufacturing coke through dry distillation of coal, and serves also as a heat exchange between a gas and a solid. In the coke oven, there are alternately arranged carbonization chambers into which coal is charged and combustion chambers for generating a heating gas via partitions. First, the partition is heated by the heating gas. Then, heat is transferred, via the partition, to the coal charged in the carbonization chamber. The coal is thus pyrolysed, and dry distillation proceeds. Silica bricks are usually used for the aforementioned partition. Further, Japanese Unexamined Patent Publication No. S52-91,001 discloses use of a partition comprising silica carbide bricks. The partition has generally a thickness within a range of from 50 to 150 mm.

Finished high-temperature coke upon the completion of dry distillation is discharged by an extruder from the extruding side to the coke side after removal of covers on the extruding side and the coke side. Then, coal of the next charge at the room temperature is charged through a coal charging port provided at the top, and the aforementioned process is repeated. The partition is shaven by the extruded coke. Repetition of heating and cooling causes joint breakage between bricks or a cracking damage to the bricks. When a cracking damage becomes larger as to run through the carbonization chamber and the combustion chamber, a dry distillation gas containing aromatic hydrocarbon leaks from the carbonization chamber into the combustion chamber, making it difficult to continue dry distillation of coal. To avoid this inconvenience, it is the usual practice to repair the above-mentioned cracking damage.

For the purpose of repairing, there is known a method of pneumatically transporting a refractory powder to an empty carbonization chamber and filling a through-crack with the refractory powder. This method, although permitting temporary reduction of gas leakage, does not ensure reinforcement of bricks, with the gas leakage reducing effect not lasting long. This is attributable to the fact that the refractory powder accumulated at the through-crack shrinks as sintering proceeds, leading to production of voids, and then, the gas flowing from the voids causes scattering of sintered pieces, thus causing again expansion of cracks. When, upon filling the through-crack with the refractory powder, the powder passes through the through-crack, reaches the combustion chamber on the other side and accumulates there, it is difficult to remove accumulation of powder from the combustion chamber. If no action is taken against this defect, a problem occurs in that the combustion space becomes smaller, leading to a lower combustion performance.

Another known method for repairing the oven wall near the oven cover is the wet spraying method of spraying a mixture of a refractory powder and water to the damaged portion. Because a prescribed strength of refractory is unavailable in this method, the refractory tends to easily peel off upon occurrence of only a slight shock. This method is therefore only a temporary measure.

The flame spraying method is also known as a repairing method of a partition. The partition is shaven by coke extruded after dry distillation or damaged by thermal spalling, and surface irregularities occur on the wall surface on the carbonization chamber side in the long run. As a result, the pressure acting on the extruder of coke increases, and under some circumstances, extruding is made impossible. In such a case, the partition is repaired by the flame spraying method with a view to preventing the surface irregularities from becoming excessive.

Repairing by the flame spraying method is accomplished by bringing a refractory powder into a semi-molten state or a molten state through a flame comprising oxygen and a fuel gas, or combustion of aluminum and silicon, thereby causing the refractory powder to adhere to the damaged portion of the partition. For example, Japanese Patent Publication No. S62-15,508 discloses a flame spraying material applicable for such a purpose (hereinafter referred to as the "prior art 2"). Japanese Patent Publication No. H03-9,185 discloses a high-silica flame spraying material comprising $SiO_2$, $Al_2O_3$, CaO, $Fe_2O_3$ and $Na_2O$ in specific percentages for forming a spray-repairing material applicable in a long-term use (hereinafter referred to as the "prior art 3"). Upon application, the aforementioned spraying material is melted by flame, hits the portion to be repaired, rapidly cooled for solidification there, and thus forms spray-repaired portion mainly comprising a glass phase. The above-mentioned glass phase further transfers to a crystalline phase during the course of cooling. At this point, volumetric shrinkage occurs in the glass phase, thus causing cracks. This leads to an insufficient bonding between the spray-repaired portion and the substrate, so that the spray-repaired portion cannot withstand a long use. Particularly when the substrate suffers from quantity degradation to a lower strength, cracks propagate from the substrate side, causing dropping of the spray-repaired portion. For applying this method, furthermore, it is necessary to previously specify the damaged portion. However, portions capable of being observed from outside are limited to portions near the cover on the extruding and coke sides. Observation of inner portions is very difficult. This method has therefore a problem of difficulty in applying to the interior of the carbonization chamber.

When there is a serious damage to the silicate bricks forming the partition, the damaged bricks are relined. With a view to avoiding a damage resulting from cooling of the remaining bricks, relining is carried out in hot. Japanese Unexamined Patent Publication No. H05-132,355 discloses a silica brick for repairing in hot excellent in thermal spalling resistance and wear resistance, for use in relining-repairing in hot of partition bricks of a coke oven (hereinafter referred to as the "prior art 4"). However, repairing operations in hot requires heavy muscular work at high temperatures, and further, leads in stoppage of coke production for a long period of time, thus resulting in a serious economic loss.

As described above, the conventional methods involve many problems to be solved. From among the conventional methods, the flame spraying method is excellent in operability and economic merits. The spray-repaired portion, being relatively satisfactory in wear resistance and durability, is not as yet sufficient. The service life of the spray-repaired portion is not determined by the strength and spalling of the spray-repaired portion itself alone, but the flame spraying method still involves the aforementioned problem of dropping of the spray-repaired portion, so that it cannot be used for a long period of time, leading to a service life of only about six months.

In a partition for a partition-type heat exchanger, for example, a partition between a carbonization chamber and a combustion chamber in a coke oven, and essential requirement is that a through-crack running from a carbonization chamber to a combustion chamber is not present in, for example, a coke oven, and a smooth wall surface should preferably be maintained. It is therefore important to improve strength and wear resistance of the partition. When a through-crack occurs in the partition, however, it is necessary to conduct a replacement of the damaged portion of the partition or a repair by the flame spraying method. When replacing the damaged portion, as described above, the apparatus operation must be discontinued for a long period of time. In an equipment in which it is substantially impossible to cool the oven for protecting the partition, such as a coke oven, there is a problem that the partition must be exchanged in hot. Further, in order to carry out a replacement of the partition or flame spraying onto the damaged portion of the partition, it is necessary to preciously specify the damaged portion, and a problem is that the replacement must be carried out in hot presenting a severe working environment.

The present invention has therefore an object is to solve the above-mentioned conventional problems, and to provide a method for repairing and/or reinforcing a partition of a partition-type heat exchanger, which permits repairing of damage such as cracks and surface irregularities occurring in the partition as in the conventional art through clogging of gas flow and formation of a smooth flat surface, and at the same time, enables to improve strength and wear resistance of the partition itself.

SUMMARY OF THE INVENTION

In accordance with one of the features of the present invention there is provided a method for repairing and/or reinforcing a partition of a partition-type heat exchanger, comprising the steps of:

feeding a gas (G-1) containing a metal and/or a metal compound, in a partition-type exchanger having a partition made of a material having gas permeability, to one side of the partition; feeding another gas (G-2) containing a reactive gas precipitating a solid metal compound as a result of reaction with the metal and/or metal compound to the other side of the partition; causing the gas (G-1) and the other gas (G-2) to reach from that one side and the other side, respectively, the interior of the partition; then causing the gas (G-1) and the other gas (G-2) to react within the partition to generate the solid metal compound; and causing precipitation of the thus generated solid metal compound into the interior of the partition, thereby repairing and/or reinforcing the partition of the partition-type heat exchanger.

In accordance with another feature of the present invention there is further provided a method for repairing and/or reinforcing a partition of a partition-type heat exchanger, wherein:

the partition in the partition-type heat exchanger has damaged portion.

In accordance with another feature of the present invention, there is further provided a method for repairing and/or reinforcing a partition of a partition-type heat exchanger, wherein:

the metal compound comprises a metal halide.

In accordance with another feature of the present invention, there is further provided a method for repairing and/or reinforcing a partition of a partition-type heat exchanger, where:

the metal comprises magnesium, and the reactive gas comprises at least one selected from the group consisting of oxygen, carbon monoxide and water.

In accordance with another feature of the present invention, there is further provided a method for repairing and/or reinforcing a partition of a partition-type heat exchanger, wherein:

magnesium comprises magnesium vapor generated by causing a reaction between magnesium oxide and aluminum at a temperature within a range of from 850 to 1,700° C.

In accordance with another feature of the present invention, there is further provided a method for repairing and/or reinforcing a partition of a partition-type heat exchanger, wherein:

the partition-type heat exchanger comprises a coke oven having a carbonization chamber and a combustion chamber;

the carbonization chamber forms that one side of the partition, and the combustion chamber forms the other side of the partition;

the gas (G-1) containing the metal and/or metal compound comprises a gas containing a silicon compound, and the other gas (G-2) containing the reactive gas comprises a combustion gas generated in the combustion chamber;

the reaction between the gas (G-1) and the other gas (G-2) is caused by changing the pressure in the carbonization chamber and the combustion chamber so that the pressure difference between the carbonization chamber and the combustion chamber (carbonization chamber pressure-combustion chamber pressure) becomes alternately positive and negative; and the solid metal compound for causing precipitation in the interior of the partition comprises silicon dioxide.

In accordance with another feature of the present invention, there is further provided a method for repairing and/or reinforcing a partition of a partition-type heat exchanger, wherein:

prior to feeding the gas (G-1) containing the metal and/or the metal compound to that one side, a preliminary repair is applied to the damaged portion.

In accordance with another feature of the present invention, there is further provided a method for repairing and/or reinforcing a partition of a partition-type heat exchanger, wherein:

the reaction between the gas (G-1) and the other gas (G-2) is caused by changing the pressure on that one side and on the other side so that the pressure difference between the one side of the partition and the other side of the partition (pressure of the one side -pressure of the other side) becomes alternately positive and negative.

In accordance with another feature of the present invention, there is further provided a method for repairing and/or reinforcing a partition of a partition-type heat exchanger, wherein:

the pressure difference is within a range of from −200 to +200 mmAq.

In accordance with another feature of the present invention, there is further provided a method for repairing and/or reinforcing a partition of a partition-type heat exchanger, wherein:

the gas containing a silicon compound comprises a gas containing at least 0.1 vol. % silicon tetrachloride, and the combustion gas comprises a gas containing at least 1 vol. % water.

In accordance with another feature of the present invention, there is further provided a method for repairing and/or reinforcing a partition of a partition-type heat exchanger, comprising the steps of:

arranging, in a heat exchanger having a partition formed of a material having gas permeability between a heated chamber and a heating chamber, a flat plate having gas permeability in the proximity to, or in partial contact with, the wall surface of the partition in the heated chamber; filling a space formed between the wall surface and the flat plate with an inorganic powder; then, feeding a gas (G-1) containing a metal and/or metal compound to the heated chamber; feeding another gas (G-2) containing a reactive gas causing precipitation of solid metal compound through reaction with the metal and/or the metal compound to the heating chamber; causing the gas (G-1) and the other gas (G-2) to individually reach the space filled with the inorganic powder and the interior of the partition; and then, causing the gas (G-1) to react with the other gas (G-2) in the space and in the interior of the partition, thereby generating the solid metal compound between particles of the inorganic powder and in the interior of the partition.

DESCRIPTION OF THE PREFERRED EMBODIMENTS

Figure 1:
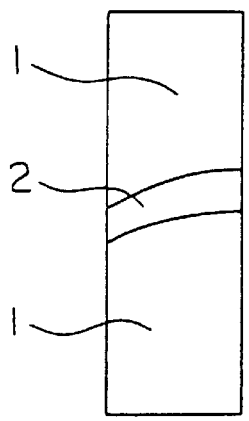
FIG. 1 is a schematic longitudinal sectional view of a through-damaged portion of a partition for illustrating a first stage of the principle of the repairing method of the present invention.

As a result of extensive studies carried out to achieve the above-mentioned objects, the present inventors obtained the following findings. By feeding a gas (G-1) containing a metal or metal compound from a side of a gas-permeable material such as a partition having a through-crack, a partition having an air hole, and a shaped member filled with an inorganic powder (hereinafter referred to as the "inorganic powder-containing member"), feeding another gas (G-2) containing a reactive gas causing precipitation of a solid metal compound through reaction with the aforementioned metal or metal compound from the other side thereof, causing the gas (G-1) to react with the other gas (G-2) for precipitation of a solid metal compound at the gas permeating portion of the gas-permeable material, and accumulating the precipitate, it is possible to substantially prevent a gas from passing through the above-mentioned partition and the inorganic powder-containing member, and at the same time, to improve strength and wear resistance of the partition and the inorganic powder-containing member.

The present invention was developed on the basis of the aforementioned findings. The method of the invention will now be described in detail.

There is no particular restriction on the structure of a partition separating a heating gas from a heated object of a partition-type heat exchanger to which the method for repairing and/or reinforcing a partition of the invention is applicable. Applicable shapes of the partition include a plate and a tube.

No particular limitation is required also for the material for the partition, but a known material may be used. Preferable materials for the partition include ones resistant to heat shock including oxides such as silica, mullite, codielite ($2MgO/2Al_2O_3/5SiO_2$) and magnesia-alumina-silicate, carbides such as silicon carbide, nitrides such as silicon nitride, and composite material such as silicon nitride-bond-silicon carbide. As the material for the partition between the carbonization chamber and the combustion chamber of a coke oven, silica brick mainly comprising tridimite crystal currently most commonly used, and the thickness of the partition should be within a range of from 50 to 150 mm.

An essential requirement for the material forming the partition of heat exchanger is to have pores to ensure a high thermal shock resistance. When manufactured by the known powder sintering method, pores in the resulting material comprise gas-permeable open pores. The term "gas permeable" means that, while a material allows transmission of a gas containing a metal and/or a metal compound, it cannot allow passage of an inorganic powder. An essential requirement for the material for the flat plate used in the method for repairing and/or reinforcing a partition of the invention is to be gas-permeable as in the case of the aforementioned partition. The reason is that, in the present invention, various gases used in the invention must enter through the both side surfaces of the partition and the flat plate into the interior thereof, come into contact with each other in the interior thereof, and cause precipitation reaction of a solid metal compound.

In order for the partition and the flat plate to be gas-permeable, it suffices that the materials forming them have open pores. Refractory bricks used for the partition and the like of a coke oven have open pores, and for example, silica brick has an open porosity within a range of from 15 to 40 vol. %. In the present invention, the open porosity should preferably be at least 5 vol. %. With an open porosity of under 5 vol. %, it is difficult to cause precipitation of the metal compound in a quantity sufficient for the desired purpose in pores. An upper limit value of open porosity would pose no problem so far as it is within the range of open porosity for usual refractory materials. It is not therefore necessary to provide a particular limitation.

The gas containing a metal and/or a metal compound will now be described.

The gas (G-1) containing a metal and/or a metal compound, which must allow transmission of a gas-permeable material, should be a gas containing a gas-phase metal or a gas-phase metal compound.

The metal should preferably have a high vapor pressure such as Mg, and applicable metal compounds include, for example, hydrides such as $SiH_4$; alkyl metals such as $Al(CH_3)_3$, $Al(C_2H_5)_3$, $Si(CH_3)_4$ and $Si(C_2H_5)_4$; halides such as $AlCl_3$, $SiCl_4$, $TiCl_4$ and $ZrCl_4$; oxyhalides such as $Si_2OCl_6$ and $ZrOCl_2$; hydrohalides such as $SiH_2Cl_2$; and alkoxydes such as $Al(C_3H_7O)_3$, $Si(CH_3O)_4$, and $Si(C_2H_5O)_4$. A metal and/or a metal compound alone may be used, and dilution may be made with a gas not reacting with the metal and/or the metal compound. As the diluting gas, for example, $N_2$ and Ar are used appropriately.

The other gas (G-2) containing a reactive gas should contain a gas which causes precipitation of a solid metal compound through reaction with the aforementioned metal and/or metal compound. Applicable reactive gases include $O_2$, $H_2O$, $CO_2$, $N_2$, $NH_3$, $N_2O$ and various hydrocarbons (alkanes such as $CH_4$, $C_2H_5$ and $C_3H_7$, alkenes such as $C_2H_4$ and $C_3H_6$, and alkynes such as $C_2H_2$).

When adopting $O_2$, for example, as a reactive gas, a solid oxide can be precipitated through any of the following reactions by means of a combination with various metals or metal compounds:

$$Al_2Cl_6 + 3/2 O_2 \rightarrow Al_2O_3 + 3Cl_2$$

$$SiH_4 + O_2 \rightarrow SiO_2 + 2H_2$$

$$MgCl_2 + 1/2 O_2 \rightarrow MgO + Cl_2$$

$$SiCl_4 + O_2 \rightarrow SiO_2 + 2Cl_2$$

$$TiCl_4 + O_2 \rightarrow TiO_2 + 2Cl_2$$

$$ZrCl_4 + O_2 \rightarrow ZrO_2 + 2Cl_2$$

$$Al(CH_3)_3 + 15/2 O_2 \rightarrow 1/2 Al_2O_3 + 3CO_2 + 9/2 H_2$$

$$Mg + 1/2 O_2 \rightarrow MgO.$$

When selecting $H_2O$, for example, as a reactive gas, a solid oxide can be precipitated through any of the following reactions by means of a combination with various metals or metal compounds:

$$MgCl_2 + H_2O \rightarrow MgO + 2HCl$$

$$SiCl_4 + 2H_2O \rightarrow SiO_2 + 4HCl$$

$$TiCl_4 + 2H_2O \rightarrow TiO_2 + 4HCl$$

$$ZrCl_4 + 2H_2O \rightarrow ZrO_2 + 4HCl$$

$$Al_2Cl_6 + 3H_2O \rightarrow Al_2O_3 + 6HCl$$

$$Al(C_2H_5)_3 + 3/2 H_2O \rightarrow 1/2 Al_2O_3 + 3C_2H_6$$

$$Si(CH_3O)_4 + 2H_2O \rightarrow SiO_2 + 4CH_3OH$$

$$Si(C_2H_5O)_4 + 2H_2O \rightarrow SiO_2 + 4C_2H_5OH$$

$$Mg + H_2O \rightarrow MgO + H_2.$$

When selecting $CO_2$, for example, as a reactive gas, a solid oxide can be precipitated through any of the following reactions by means of a combination with various metals or metal compounds:

$$SiH_4 + 2CO_2 \rightarrow SiO_2 + 2CO + 2H_2$$

$$Mg + CO_2 \rightarrow MgO + CO.$$

When selecting $CO_2$ and $H_2$, for example, as reactive gases, a solid oxide $Al_2O_3$ can be precipitated through any of the following reactions:

$$MgCl_2 + CO_2 + H_2 \rightarrow MgO + CO + 2HCl$$

$$Al_2Cl_6 + 3CO_2 + 3H_2 \rightarrow Al_2O_3 + 3CO + 6HCl.$$

When selecting $N_2$ and $H_2$, for example, as reactive gases, a nitride AlN can be precipitated through the following reaction:

$$Al_2Cl_6 + N_2 + 3H_2 \rightarrow 2AlN + 6HCl.$$

When selecting $NH_3$, for example, as a reactive gas, a nitrides can be precipitated through any of the following reactions:

$$SiH_4 + 4/3 NH_3 \rightarrow 1/3 Si_3N_4 + 4H_2$$

$$3SiH_2Cl_2 + 10NH_3 \rightarrow Si_3N_4 + 6NH_4Cl + 6H_2$$

$$SiCl_4 + 16/3 NH_3 \rightarrow 1/3 Si_3N_4 + 4NH_4Cl$$

$$TiCl_4 + 4/3 NH_3 \rightarrow TiN + 4HCl + 1/6 N_2$$

$$ZrCl_4 + 4/3 NH_3 \rightarrow ZrN + 4HCl + 1/6 N_2.$$

When selecting $CH_4$, for example, as a reactive gas, a carbides can be precipitated through any of the following reactions:

$$SiH_4 + CH_4 \rightarrow SiC + 4H_2$$

$$TiCl_4 + CH_4 \rightarrow TiC + 4HCl$$

$$TiI_4 + CH_4 \rightarrow TiC + 4HI.$$

When selecting $C_2H_2$ and $H_2$, for example, as a reactive gases, a carbide TiC can be precipitated through the following reactions:

$$TiI_4 + 1/2 C_2H_2 + 3/2 H_2 \rightarrow TiC + 4HI.$$

When selecting $CH_4$ and $H_2$, for example, as reactive gases, a carbide $Cr_3C_2$ can be precipitated through the following reaction:

$CrCl_3+2/3CH_4+1/3H_2 \rightarrow 1/3Cr_3C_2+3HCl$.

As a metal oxide contained in the gas (G-1), a mixture of a plurality of metal oxides may be used. As a reactive gas contained in the other gas (G-2), a mixture of a plurality of reactive gases may be employed. In this case, a precipitate comprising a plurality of components is available.

The appropriate reaction temperature for the reaction between the gas (G-1) containing a metal compound and the other gas (G-2) containing a reactive gas varies with the combination of a metal compound and a reactive gas. For example, in a combination of an alkyl metal, $O_2$ and $H_2O$, temperature should preferably be within a range of from 300 to 800° C. At a temperature of under 300° C., the reaction rate is too low. At temperature of over 800° C., on the other hand, the alkyl metal is pyrolysis during preliminary heating and during transfer to the reaction site. It is therefore difficult to cause a desired reaction.

In the combination of alkoxyd and $H_2O$, temperature should preferably within a range of from 200 to 700° C. At a temperature of under 200° C., the reaction rate is too low. At a temperature of over 700° C., on the other hand, alkoxyd is pyrolysed in the stage of preheating. It is therefore difficult to cause a desired reaction.

In the combination of a halides, an oxyhalides and/or a hydrohalides with $O_2$, $H_2O$, $N_2$, $NH_3$, $N_2O$ and/or a hydrocarbon, temperature should preferably be at least 600° C. At a temperature of under 600° C., the reaction rate is too low.

In a combination of Mg vapor with at least a gas selected from the group consisting of $O_2$, $H_2O$ and $CO_2$, temperature should preferably be at least 700° C. At a temperature of under 700° C., part of Mg vapor is condensed during transfer to the reaction site so that Mg is not effectively utilized, thus making it difficult to cause a desired reaction.

Mg vapor may be generated by heating molten magnesium. In this case, the heating temperature should preferably be within a range of from 700 to 1,200° C. At a temperature of under 700° C., the reaction rate is too low. At a temperature of over 1,200° C., on the other hand, Mg vapor is vigorously generated, thus making it difficult to control the flow rate and pressure of the gas containing the metal compound. Magnesium serving as a starting material may either in the form of an ingot or in a powder form. When magnesium is in a powder form, the powder may comprise Mg alone or a mixture Mg—CaO or Mg—Al. A mixed powder is preferable because Mg powder is flammable.

Mg vapor may be generated from MgO and Al through the following reaction:

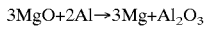
$3MgO+2Al \rightarrow 3Mg+Al_2O_3$

The reaction temperature should preferably be within a range of from 850 to 1,700° C. At a temperature of under 850° C., the reaction rate is too low. At a temperature of over 1,700° C., on the other hand, Mg vapor is vigorously generated, thus making it difficult to control the flow rate and pressure of the gas containing the metal compound.

The concentration of the metal or the metal compound in the gas (G-1) containing the metal or the metal compound should preferably be at least 0.1 vol. %. With a concentration of the metal or the metal compound of under 0.1 vol. %, the reaction rate is too low. The concentration of the reactive gas in the other gas (G-2) containing the reactive gas should preferably be at least 1 vol. %. With a concentration of under 1 vol. %, the reaction rate is too low.

When the other gas (G-2) containing the reactive gas contains at least two gases selected from the group consisting of $N_2$, $CO_2$, $H_2O$ and $O_2$, pure gases may be mixed, or any of various fuel gases may be used. An applicable fuel gas is, for example, a gas obtained through combustion of natural gas, liquefied petroleum gas, kerosene, heavy oil, coal, coke oven gas, blast furnace gas or converter gas with air and/or oxygen. Any of waste gases from various heating furnaces may be used as required. When using $CH_4$ as a reactive gas, natural gas and/or coke oven gas may be used after heating.

Pressure of the gas (G-1) containing the metal or the metal compound and the other gas (G-2) containing the reactive gas should preferably be the highest possible within a range of durability of the heat exchanger. The reaction between the gas (G-1) and the other gas (G-2) proceeds more rapidly according as these gases have a higher pressure. When the pressure of these gases is low, reaction products precipitate onto the solid. When these gases have a high pressure, in contrast, reaction product particles precipitate in gaseous phase of these gases and then are accumulated in the form of aggregate on the solid.

Therefore, even when a relatively large gap such as a through-damage occurs in the partition, or a small gap such as an open pore occurs between particles of a formed member of an inorganic powder or in a refractory having gas permeability, the precipitated solid metal compound accumulates in this gap, permitting repair and reinforcement of the partition, according to the present invention.

The gas (G-1) containing the metal or the metal compound is fed from a side of the partition, and the other gas (G-2) containing the reactive gas is fed from the other side of the partition. The gas (G-1) and the other gas (G-2) are brought into contact with each other at the through-damage portion of the partition for reaction. At this point, it is important to cause these gases to reach the entire through-damage portion. Means for this purpose include flowing of the two gases and diffusion of the gases. The diffusion rate of the metal and the metal compound is smaller than that of the reactive gas. A forced convection may be caused by using a higher pressure of the other gas (G-2) containing the reactive gas than the pressure of the gas (G-1) containing the metal or the metal compound. Or, alternate transfer of these gases to the through-damage portion may be promoted by periodically reversing the relative magnitude of pressure of these gases on the both sides of the partition, thereby periodically reversing the pressure gradient in the longitudinal direction of the through-damage portion in the partition.

When precipitation of the solid metal compound proceeds and the through-damage portion is filled up, the gases can no more come into contact, and the reaction between the gas (G-1) and the other gas (G-2) is automatically discontinued. However because it takes a long period of time to fully fill up the through-damage portion, the extent of fill up may be a practicable one. That is, fill-up may be discontinued at an extent to which gases cannot substantially pass through the through-damage portion. The aforementioned extent of fill-up to which the gases cannot substantially pass through the through-damage portion may be determined, for example, by setting a prescribed lower limit value for the consuming rate of the gas containing the metal or the metal compound, and detecting the moment when the gas consuming rate reaches this lower limit value. As another method for determining the extent of fill-up, the gas containing the metal or the metal compound is fed intermittently to the through-damage portion, and the moment when the decreasing rate of pressure of the fed gases becomes below a prescribed value is determined as a substantial fill-up.

The reason why the pressure on one side of the partition and the pressure on the other side should preferably be changed so that the pressure difference between a side of the partition to which the gas (G-1) is fed of the partition-type heat exchanger and the other side of the partition to which the other gas (G-2) is fed (pressure on one side-pressure on the other side) is alternately positive and negative, and the preferable forms of the gas (G-1) and the other gas (G-2) will now be described.

The following description will be based on an assumption that a coke oven having a carbonization chamber and a combustion chamber is used as a partition-type heat exchanger, a gas containing a silicon compound, as a gas (G-1) and a combustion gas, as another gas (G-2). The flow rate of the gas (G-1) containing the silicon compound and the combustion gas (G-2) into poses in the partition of the coke oven becomes higher by changing the pressure in the carbonization chamber and the combustion chamber so that the pressure difference between the carbonization chamber and the combustion chamber (carbonization chamber pressure-combustion chamber pressure) is alternately positive and negative. Upon switchover of the pressure difference from positive to negative or negative to positive, a part of the gases on the side leaving the partition remains in the open pores in the partition of the coke oven, and at the same time, the gases on the side approaching the partition flow into the open pores. This improves the contact efficiency of the two gases and accelerates precipitation of silicon dioxide in the open pores. By the repetition of the aforementioned process, it is possible to further improve the repairing operation efficiency, and to cause uniform precipitation of silicon dioxide in damaged portions over the entire partition, open pores and between particles of the inorganic powder filler.

Silicon dioxide may be either non-crystalline or crystalline. Silicon dioxide, having a small thermal expansion coefficient in both cases, does not suffer from deterioration of thermal shock resistance even with a reduced porosity of the partition caused by precipitation. The pressure difference between the carbonization chamber and the combustion chamber (carbonization chamber pressure—combustion chamber pressure) should be switched over between positive and negative preferably within a range of from −200 to +200 mmAq. The pressure in a combustion chamber is usually within a range of from −20 to +20 mmAq. When the pressure of the carbonization chamber becomes smaller than that of the combustion chamber, and the pressure difference is over −200 mmAq (a larger absolute value), ingression of air from outside the coke oven into the carbonization chamber is unavoidable. A part of the gas (G-1) containing the silicon compound is therefore consumed in a reaction with air in the carbonization chamber, and is not therefore utilized for repairing the through-damage portions of the partition and the flat plate. In contrast to this, on the other hand, when the pressure of the carbonization chamber becomes higher than that of the combustion chamber, and the pressure difference exceeds +200 mmAq, the gas (G-1) containing the silicon compound inevitably leaks to outside the coke oven. This not only prevents effective utilization of the gas containing the silicon compound, but also impairs the working environment.

Applicable silicon compounds include hydrides such as SiH4, alkyl metals such as $Si(CH_3)_4$ and $Si(C_2H_5)_4$, halides such as $SiCl_4$, oxyhalides such as $Si_2OCl_6$, hydrohalides such as $SiH_2Cl_2$, and alkoxydes such as $Si(CH_3O)_4$ and $Si(C_2H_5O)_4$. Any of these compounds may used alone, or at least two silicon compounds selected from the group consisting of the above compounds may be used. The silicon compound may be used after diluting with a gas not to react with these metal compounds. Applicable diluting gases include $N_2$ and Ar.

Among these silicon compounds, $SiCl_4$ is thermally stable and is not pyrolised at a temperature within a range of from 900 to 1,450° C., which is the partition temperature during usual operation of a coke oven. It is therefore particularly preferably silicon compound.

The most desirable component of the combustion gas for reacting with $SiCl_4$ is $H_2O$. The reason is that, at a temperature within the aforementioned range, the reaction rate between $H_2O$ and $SiCl_4$ is so high that, unless the quantity of supplied $H_2O$ is smaller than the stoichiometric value, $SiCl_4$ is never released without reaction. The concentration of $SiCl_4$ in the gas containing the silicon compound should preferably be limited within a range of from 0.1 to 100 vol. %. With a concentration of under 0.1 vol. %, the reaction rate is too low to be practicable.

The combustion gas may be generated in the combustion chamber by a known method. By causing combustion of coke oven gas or/and blast furnace gas with air, a gas containing from 1 to 25 vol. % $H_2O$ and from 5 to 30 vol. % $CO_2$ is available. Combustion of the aforementioned gas with excess air permits preparation of a gas containing $O_2$. By enriching with $O_2$ and blowing steam, it is possible to increase the $H_2O$, $CO_2$ and $O_2$ concentrations while maintaining an appropriate temperature. The concentration of $H_2O$, $CO_2$ or/and $O_2$ in the combustion gas should preferably be within a range of from 1 to 100 vol. %. With a concentration of under 1 vol. %, the reaction rate is too low to be practicable.

According to findings obtained by the present inventors, a through-damage portion can be filled up in a short period of time by feeding a refractory powder (by pneumatic transfer) with the air as a carrier gas into an empty carbonization chamber of a coke oven to fill up a through-damage portion of a partition, and then supplying a gas containing a silicon compound to the carbonization chamber.

Figure 2:
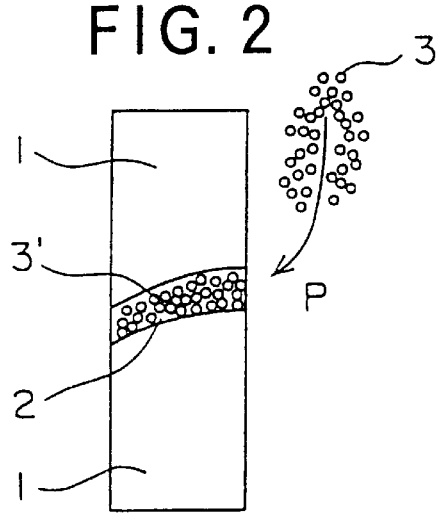
FIG. 2 is a schematic longitudinal sectional view of a through-damaged portion of a partition for illustrating a second stage of the principle of the repairing method of the present invention.
Figure 3:
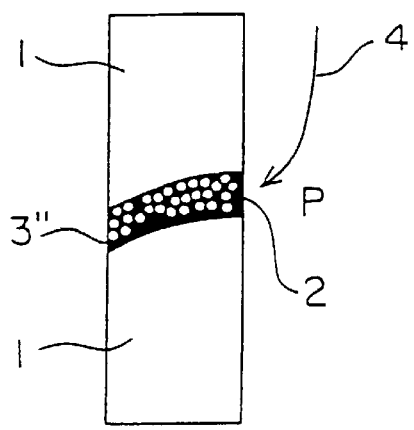
FIG. 3 is a schematic longitudinal sectional view of a through-damaged portion of a partition for illustrating a third stage of the principle of the repairing method of the present invention.

FIGS. 1 to 3 are schematic longitudinal sectional view of a through-damage portion of a partition illustrating the principle of the method of the present invention of filling the through-damage portion with an inorganic powder by pneumatic transfer, and causing precipitation of $SiO_2$ between particles of the inorganic powder having thus filled up the through-damage portion, thereby repairing the through-damage portion of the partition. As shown in FIG. 1, a through-damage portion 2 is present in a partition 1 between a carbonization chamber and a combustion chamber. First, as shown in FIG. 2, a refractory powder 3 is pneumatically transported from the empty carbonization chamber P side. At least a part of the refractory powder 3 is caused to come in the through-damage portion 2 having a size allowing ingression of the refractory powder 3 to form a packed layer 3' of the refractory powder 3. Then, as shown in FIG. 3, a gas 4 containing a silicon compound from the carbonization chamber P side was fed. By keeping the pressure difference between the carbonization chamber and the combustion chamber, as measured at the coke oven top, substantially at 0 mmAq, or, by altering the pressure difference in the proximity of 0 mmAq, precipitated $SiO_2$ is caused to settle in gaps between particles of the refractory powder 3 within the through-damage portion 2, or in fine through-damages (not shown) into which the refractory powder 3 could not penetrate, to form of sedimentation layer 3″. Substantial fill-up of the through-damage portion produced in the partition is thus completed.

The refractory powder used in the repairing method of a partition having a through-damage portion is a fine powder having a particle size of no more than 0.2 mm, and should preferably have a feature of being sintered at a temperature within a range of from 900 to 1,450° C. A typical such refractory powder is the one containing at least 80 wt. % $SiO_2$ or/and $Al_2O_3$. The aforementioned refractory powder relatively easily comes in a through-damage portion having an opening of at least 1 mm and forms a packed layer of the refractory powder. Then, under the effect of sedimentation of $SiO_2$ precipitated by a reaction between the gas containing the silicon compound and the combustion gas, the pores of the aforementioned packed layer can be closed. This method is particularly effective for repairing a through-damage having an opening of at least 1 mm.

The present inventors further obtained the following findings. In a coke oven having a partition made of a gaspermeable material, by arranging a gas-permeable flat plate in the proximity to a partition surfaces in a carbonization chamber, then, feeding an inorganic powder to a space formed by the flat plate and the partition surface to prepare an inorganic powder packing. After that, the carbonization chamber is filled with the gas containing a silicon compound, and then a combustion gas is generated in a combustion chamber. Changing the carbonization chamber pressure and the combustion chamber pressure so that the pressure difference between the carbonization chamber and the combustion chamber (carbonization chamber pressure—combustion chamber pressure) is alternately positive and negative, silicon dioxide precipitates between particles of the inorganic powder packing to firmly bind to the inorganic powder particles, and at the same time, silicon dioxide precipitates also in the pores of the partition, thereby reinforcing the partition.

The gas-permeable flat plate is required to be resistant to heat at temperature of the partition of an ordinary coke oven and to HCl. The flat plate has two functions: one is the function of forming a space into which the inorganic powder is to be packed as a frame, and another is the function of feeding a gas containing a silicon compound as uniformly as possible to the interior of the flat-shaped inorganic powder packing. The gas-permeable flat plate should therefore have a feature of allowing passage of a gas, but not passage of the supplied inorganic powder. Applicable gas-permeable flat plates include formed or woven products of glass wool, rock wool, alumina fiber, zirconia fiber and carbon fiber, gypsum board, and calcium silicate plate.

Ceramics is suitable as an inorganic powder fill up, and a metal may be added thereto. Applicable ceramic components include oxides such as $SiO_2$, $Al_2O_3$, $ZrO_2$ and MgO, composite oxides containing oxides selected from this oxide group, carbides such as SiC, nitrides such as $Si_3N_4$, and oxinitrides such as SiAlON. The ceramic component may be a synthesized product or a natural mineral. Typical examples include silica sand, natural mullite, and chamotte. Fused quartz is preferable because of a small thermal expansion coefficient. SiC is suitable as well because of excellent heat conductivity and wear resistance. Applicable metals to be added include Si and Al which give stable $SiO_2$ and $Al_2O_3$ through oxidation.

The inorganic powder should not produce an unpacked portion upon packing into a narrow space between the gas-permeable flat plate and the partition. It should preferably fill up fine surface irregularities and cracks on the partition. It is therefore desirable to supply the inorganic powder by pneumatic transfer. While there is no restriction on the transfer medium, air and nitrogen are preferable.

According to the method of the invention not using a flat plate, it is possible to improve strength of the partition of a coke oven using fresh bricks, ensure closure of a through-crack damage portion occurring in the partition, and improve strength of the partition of an operating coke oven. In contrast, according to the repairing method of the invention using a gas-permeable flat plate, an effect of smoothing irregularities caused by frictions occurring on the carbonization chamber side surface of the operating coke oven is available in addition to the above.

Embodiments of the invention will now be described with reference to the drawings.

A first embodiment covers a method for repairing and/or reinforcing a partition with or without a damage thereto by causing precipitation of a metal compound generated by reaction between a gas (G-1) and another gas (G-2) in the interior of the partition of a heat exchanger.

Figure 4:
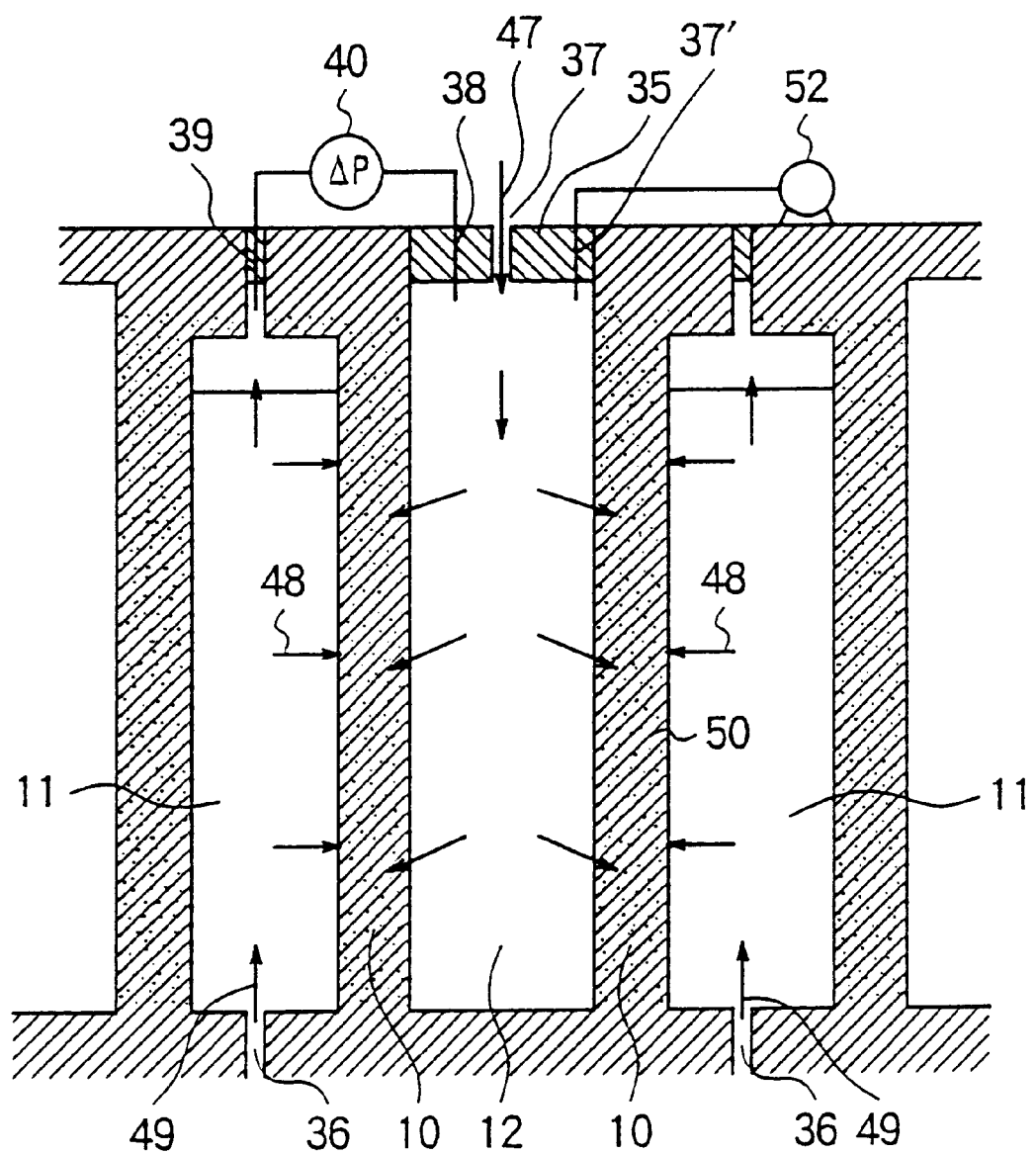
FIG. 4 is schematic longitudinal sectional view of a partition-type heat exchanger illustrating a first embodiment of the invention.

FIG. 4 is a schematic longitudinal sectional view of the partition-type heat exchanger illustrating the first embodiment: 10 is a partition; 11 is a heating chamber; 12 is a heated chamber; 35 is a cover; and 36 and 37 are gas inlets. FIG. 4 illustrates a portion of the heat exchanger in which the heating chamber and the heated chamber communicate with each other with the partition in between.

In the first embodiment, the gas (G-1) 47 containing a metal compound is fed from the gas inlet 37 to the heated chamber 12 on one side of the gas-permeable partition 10 of the heat exchanger. On the other hand, the other gas (G-2) 48 containing the reactive gas causing precipitation of a metal compound through reaction with the aforementioned metal compound is fed from the gas inlet 36 to the heating chamber 11 on the other side of the partition 10. A fuel gas (not shown) may be fed from the gas inlet 36 to the heating chamber 11, and may be transformed into a combustion gas as the other gas (G-2) 48 containing a reactive gas by causing combustion in the heating chamber 11.

Since the partition 10 is gas-permeable to a degree corresponding to a prescribed open porosity, these gases (G-1 and G-2) enter the partition 10 from the both sides thereof, come into contact in the open pores of the partition, react with each other, and precipitate a solid metal compound 50 in the open pores. The solid metal compound 50 having precipitated in the open pores of the partition 10 contributes to improvement of strength of the partition in the interior thereof.

In the aforementioned embodiment, ingression of the gas (G-1) and the other gas (G-2) into the open pores of the partition 10 is made easier and the reaction between the gases is accelerated, by altering the pressure so that the pressure difference between the pressure in the heated chamber 12 and the pressure in the heating chamber 11 is alternately positive and negative.

In a second embodiment of the invention, a partition is repaired and reinforced with a solid oxide precipitated as a result of a reaction between the gas (G-1) and the other gas (G-2) after forming a flat plate packing of an inorganic powder in close contact with the surface of the partition on the side facing the heated chamber of the heat exchanger, and further reinforced by the aforesaid inorganic powder packing. The second embodiment covers partitions with as well as without a damage.

Figure 5:
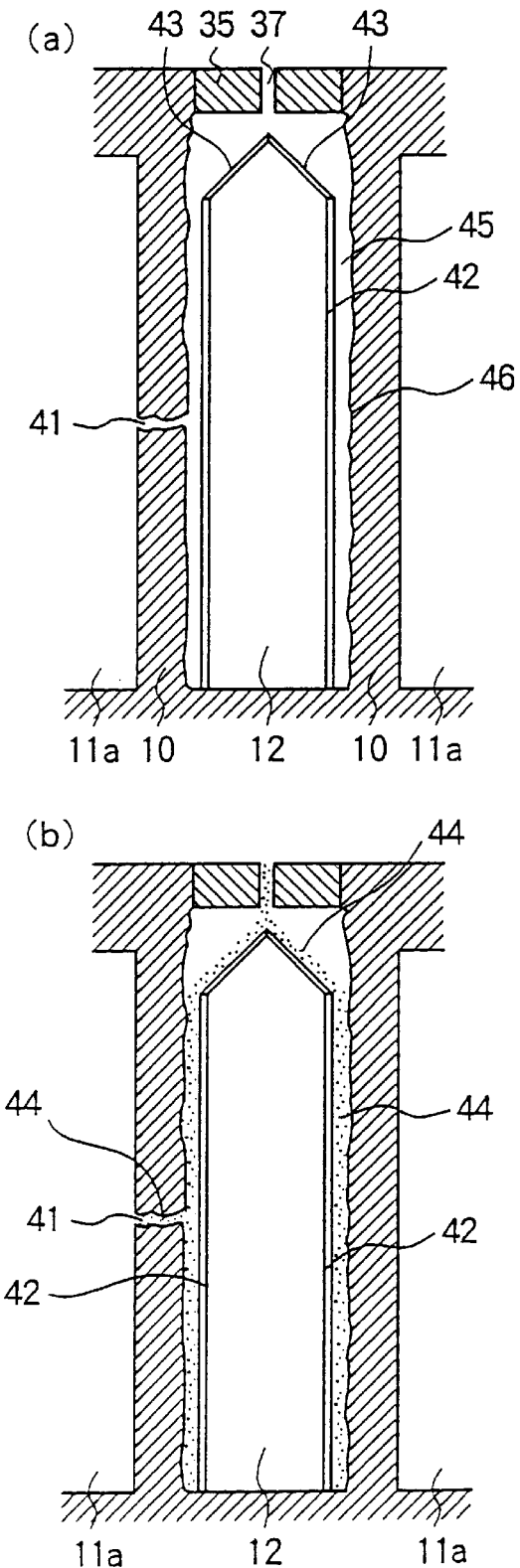
FIG. 5 is a schematic longitudinal sectional view of a partition-type heat exchanger illustrating a first half of a second embodiment of the invention.
Figure 6:
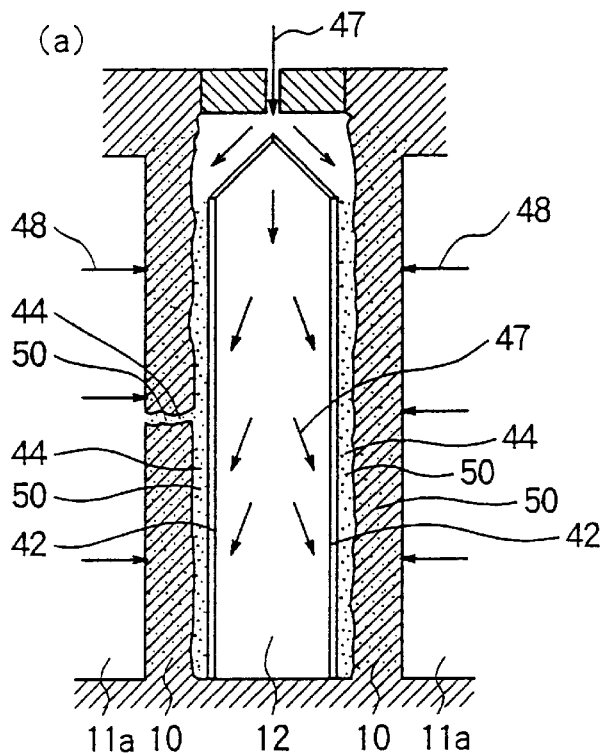
FIG. 6 is a schematic longitudinal sectional view of a partition-type heat exchanger illustrating a latter half of the second embodiment of the invention.
Figure 6:
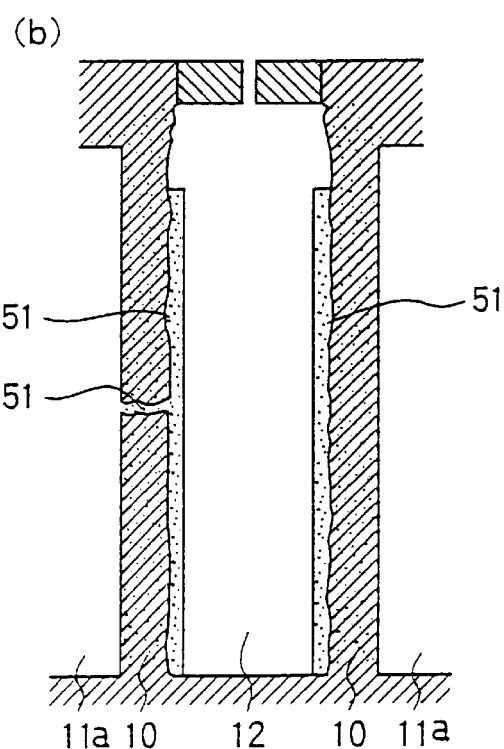
Figure 10:
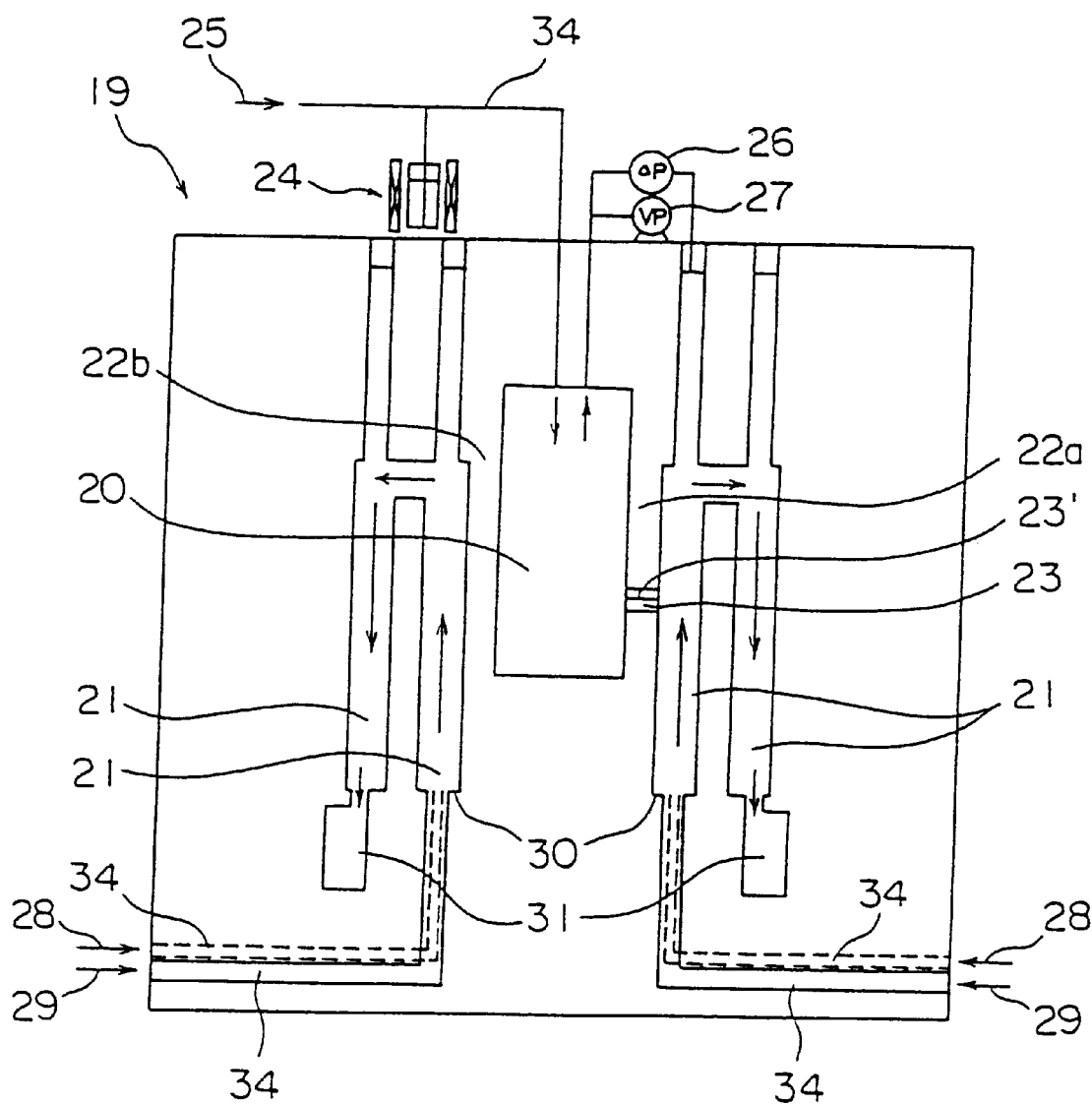
FIG. 10 is a schematic longitudinal sectional view of an apparatus used in Example 6 of the invention.

FIGS. 5 and 6 are schematic longitudinal sectional views illustrating the second embodiment of the invention. In FIGS. 5 and 6, 10 is a partition; 11a is a portion of a heating chamber; 12 is a heated chamber; 35 is a cover; 37 is a gas inlet; 41 is a through-crack damage; 42 is a flat plate; 44 is an inorganic powder; 45 is a space; and 46 represents surface irregularities on the partition surface on the side facing the heated chamber. FIGS. 5 and 6 illustrate a portion of the heat exchanger in which the heating chambers and the heated chambers are alternately arranged in series with the partition in between.

In the second embodiment, as shown in FIGS. 5 and 6, the gas-permeable flat plate 42 is arranged in the proximity to, or in partial contact with, the partition 10 surface of the heated chamber 12 of the heat exchanger having the partition 10 (see FIG. 5(a)), and the space 45 formed between the above-mentioned partition surface and the flat plate 42 is filled with the inorganic powder 44 (see FIG. 5(b)). Then, a gas (G-1) 47 containing a metal compound is fed to the heated chamber 12, and on the other hand, another gas (G-2) 48 containing a reactive gas causing precipitation of a solid metal compound 50 through reaction with the metal compound is fed to the heating chamber 11. Because the partition 10 and the flat plate 43 have a gas permeability corresponding to a prescribed open porosity, the two gases (G-1 and G-2) come into the interior of an inorganic powder 44 layer charged into the interior of the partition 10 and the space 45, come into contact with each other in the open pores of the partition 10 and between particles of the inorganic powder 44, react, and cause precipitation of a solid metal compound 50 (see FIG. 6(a)). The metal compound having precipitated in the open pores of the partition 10 contributes to improvement of strength of the partition in the interior thereof. The metal compound having precipitated between particles of the inorganic powder 44 forms an inorganic powder layer 51 firmly connected in the interior of the inorganic powder 44 layer, which is connected to the partition surface.

In this embodiment, ingression of the gas (G-1) and the other gas (G-2) into the open pores of the partition 10 and into gaps between particles of the inorganic powder 44 is made easier and the reaction between the gases is accelerated, by altering the pressure so that the pressure difference between the pressure in the heated chamber 12 and the pressure in the heating chamber 11 is alternately positive and negative.

The inorganic powder 44 is packed into the interior of the through-crack damage 41 occurring in the partition 10. The solid metal compound 50 which is a reaction product of the two gases having entered between the powder particles precipitates to form a firm inorganic powder layer 51, thereby closing and repairing the through-crack damage 41. The surface irregularities 46 produced on the partition surface are repaired into a smooth surface by the formation of the firm inorganic powder layer 51 (see FIG. 6(b)).

A third embodiment of the invention covers a method of repairing and reinforcing a partition, upon occurrence of a damage to the partition of a heat exchanger on the side facing the heated chamber, by applying a preliminary repair to the damage, the damage being present in the partition described in the first embodiment.

Applicable preliminary repairing method include a method of preliminarily packing, when a through-crack occurs in the partition, an inorganic powder to this portion by pneumatic transfer, and when peeling or wear occurs on the partition, a method of spraying an inorganic powder in hot to this portion, and a method of flame spraying a flame-spray material.

Figure 7:
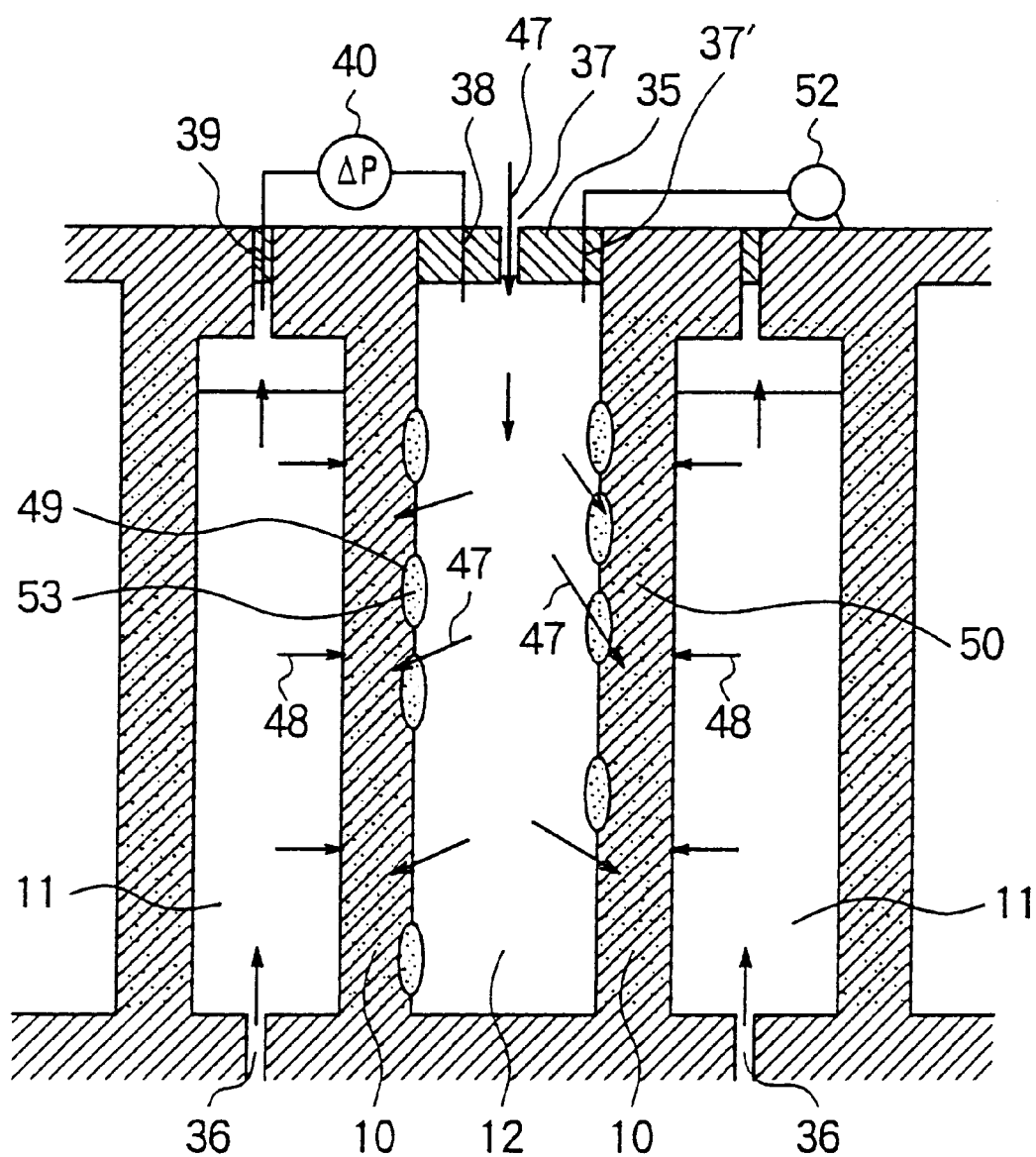
FIG. 7 is a schematic longitudinal sectional view of a partition-type heat exchanger illustrating a third embodiment of the invention.

FIG. 7 is a schematic longitudinal sectional view of a partition-type heat exchanger, illustrating a third embodiment: 10 is a partition; 11 is a heating chamber; 12 is a heated chamber; 49 is a damaged portion; 50 is a solid metal compound; and 53 is a flame-spray material. FIG. 7 illustrates a portion of a heat exchanger in which the heating chamber and the heated chamber are alternately arranged in series with the partition in between.

As shown in FIG. 7, a damage occurs in the gas-permeable partition 10 on the side facing the heated chamber 12. By flame-spraying a flame-spray material for repairing to the damaged portion 49, the flame-spray material 53 covers the damaged portion 49. Then, the gas (G-1) 47 containing a metal compound is fed from the gas inlet 37 to the heated chamber 12. On the other hand, the other gas (G-2) 48 containing a reactive gas causing precipitation of a solid metal compound through reaction with the above metal compound is fed to the heating chamber 11 from the gas inlet 36. Since the partition 10 has a gas permeability corresponding to a prescribed open porosity, the two gases (G-1 and G-2) enter not only the open pores in the partition 10 from the both sides thereof, but also between particles of the material forming the junction between the preliminarily repaired damaged portion 49 and the flame spray material 53, and cause precipitation of the solid metal compound 50 through reaction taking place in the open pores and in gaps between particles of the material of junction. The partition 10 is thus repaired and reinforced.

In this embodiment, by adjusting the pressure so that the pressure difference between the pressure in the heated chamber 12 and the pressure in the heating chamber 11 is alternately positive and negative, ingression of the gas (G-1) and the other gas (G-2) into the open pores of the partition 10 is made easier, and the reaction between the two gases is accelerated, thus improving the operating efficiency.

A fourth embodiment covers a method for repairing and reinforcing a partition, upon occurrence of a damage to the partition of a heat exchanger on the side facing the heated chamber, when a damage as shown in the second embodiment is present in the partition after application of a preliminary repair to the damaged portion.

In this embodiment, upon occurrence of a damage to the partition of the heat exchanger on the side facing the heated chamber, a repaired portion is formed by applying a prescribed preliminary repair to the damaged portion, and then, the gas-permeable flat plate is arranged in the proximity to, or in partial contact with, the surface of the partition of the heat exchanger on the side facing the heated chamber in parallel with the surface thereof. Then, an inorganic powder packing is formed in a space between the partition wall and the flat plate by pneumatic transfer. Then, the gas (G-1) is fed to the heated chamber, and on the other hand, the other gas (G-2) is fed to the heating chamber. A solid metal compound is thus caused to precipitate in the partition, in the interior of the flame-spray material, between material particles at the junction between the damaged portion and the flame-spray material, and between particles in the interior of the inorganic powder packing. The partition is thus repaired and reinforced.

EXAMPLES

The present invention will now be described further by means of examples.

Example 1

An example of the first embodiment will be described with reference to FIG. 4 for a case where the partition-type heat exchanger is a coke oven.

The coke oven comprises a coke oven battery in which carbonization chambers serving as heated chambers 12 and combustion chambers serving as heating chambers 11 are arranged alternately in series. The partition 10 between a carbonization chamber and a combustion chamber comprises silica bricks having an open porosity of 20 vol. %, and silica bricks are connected with a joint material. The carbonization chamber can be opened to the open air by means of a coal charging cover serving as a heated material charging cover 35 at the top, and two oven doors forming the front and back sides. Two flues are arranged in the combustion chamber. One flue is fed with a fuel gas 49 and air which rise up by combustion, enter the other flue, and are introduced into a heat storage chamber (not shown).

The coal charging cover is provided with a gas inlet 37 for the gas containing SiCl4 serving as the gas (G-1) 47 containing a metal compound, an exhaust port and a pressure outlet 38. A pressure outlet 39 arranging in an inspection window are provided at the top of the combustion chamber. The pressure difference is available from a pressure difference detecting meter 40 detecting a pressure difference between the carbonization chamber and the combustion chamber.

Coke oven gas serving as a fuel gas was burned in the flue to generate a combustion gas containing $H_2O$ in an amount of from 15 to 25 vol. %, and to adjust the flue exit temperature within a prescribed range of from 900 to 1,450° C. On the other hand, the oven was made empty by discharging coke from the carbonization chamber, and after placing the oven doors, a gas release valve connected to the carbonization chamber was opened. Then, after replacing the air with nitrogen gas, the release valve was closed.

Then, a gas containing $SiCl_4$ comprising 10 vol. % $SiCl_4$ and 90 vol. % $N_2$ was fed to the carbonization chamber. Feeding was discontinued when the pressure difference between the carbonization chamber and the combustion chamber (carbonization chamber pressure—combustion chamber pressure), as determined by the pressure difference detecting meter, reached +50 mmAq. The $SiCl_4$-containing gas penetrated into the open pores in the silica bricks forming the oven wall and joints, and interruptions of the joints, and the pressure difference gradually decreased. When +5 mmAq was reached, the $SiCl_4$ gas was immediately discharged through an exhaust port by means of an exhaust fan. When the pressure difference decreased from positive to negative and reached −50 mmAq, exhaustion was immediately discontinued. When the pressure difference became negative, the combustion gas penetrated in the oven from the combustion chamber toward the carbonization chamber. $H_2O$ contained in the combustion gas reacted with $SiCl_4$ remaining in the oven wall, thus causing precipitation of $SiO_2$. The precipitated $SiO_2$ serves as a binder to improve strength of the silica bricks and the joint material. Upon stoppage of exhaust at −50 mmAq, the $SiCl_4$-containing gas was immediately fed again, and the aforementioned process was repeated. After the lapse of a prescribed period of time, for example, after repetition of the process for seven hours, the operation came to an end.

Example 2

An example of the second embodiment will now be described with reference to FIGS. 5 and 6 for a case where the partition-type heat exchanger is a coke oven.

The coke oven had the same structure and functions as those described in Example 1. Silica bricks having an open porosity of 20 vol. % were employed for the partition 10 between the carbonization chamber and the combustion chamber, and the silica bricks were bound with a joint material. The partition surface on the carbonization chamber side was worn to form serious surface irregularities, and a through-crack 41 was present in the partition. The carbonization chamber can be opened to the open air through use of a coal charging cover at the top and two oven doors.

The coal charging cover is provided with a gas inlet 37 for the $SiCl_4$-containing gas, an exhaust port and a pressure outlet. The coke oven gas was burned in a flue to generate a combustion gas containing from 15 to 25 vol. % $H_2O$, and at the same time, the flue exit temperature was adjusted within a prescribed range of from 900 to 1,450° C.

On the other hand, a calcium silicate plate having a thickness of 20 mm serving as a gas-permeable flat plate 42 was fixed to a steel support, and a structure comprising a frame having a height equal to the coal charging level and a depth corresponding to the depth of the carbonization chamber, and a distributing panel 43 secured to the upper end of the frame was assembled. Then, the oven was made empty by discharging coke from the carbonization chamber, and the aforementioned structure was arranged in the carbonization chamber.

After attaching the oven doors, a release pipe of the carbonization chamber was opened to feed fused silica particles having passed through 325 mesh serving as an inorganic powder 44 to the carbonization chamber by pneumatic transfer through the $SiCl_4$-containing gas inlet. When the fused silica particles were charged to reach the upper end of the frame, feeding of the fused silica particles was immediately discontinued. The fused silica particles were distributed by pneumatic transfer to a space 45 formed between the frame and the partition 10 and into the through-crack 41 portion.

Then, air in the carbonization chamber was replaced with nitrogen gas, and the release valve was closed. An $SiCl_4$-containing gas comprising 10 vol. % $SiCl_4$ and 90 vol. % $N_2$ was fed to the carbonization chamber. Feeding was discontinued when the pressure difference between the carbonization chamber and the combustion chamber (carbonization chamber pressure—combustion chamber pressure), as determined by the pressure difference detecting meter, reached +50 mmAq. The $SiCl_4$-containing gas penetrated into the fused silica packing layer, the open pores of the silica bricks and joints thereof forming the oven wall, and interruptions of the joints, and the pressure difference gradually decreased. When +5 mmAq was reached, the $SiCl_4$-containing gas was immediately discharged through an exhaust port by means of an exhaust fan. When the pressure difference decreased from positive to negative and reached −50 mmAq, exhausting was immediately discontinued. When the pressure difference became negative, the combustion gas penetrated in the oven from the combustion chamber toward the carbonization chamber. $H_2O$ contained in the combustion gas serving as the gas (G-2) 48 containing the reactive gas reacted with the fused silica packing layer serving as the inorganic powder layer 51 and $SiCl_4$ remaining in the oven wall, thus causing precipitation of $SiO_2$ serving as the metal compound 50. The precipitated $SiO_2$ served as a binder, imparted a strong shape-keeping property to the fused silica packing layer, and improved strength of the silica bricks and the joint material. Upon stoppage of exhaust at −50 mmAq, the $SiCl_4$-containing gas was immediately fed again, and the aforementioned process was repeated. After the lapse of a prescribed period of time, i.e., for example, after repetition of the process for seven hours, the gas in the carbonization chamber was substituted with nitrogen, and the operation came to an end.

Then, the oven doors were opened and the structure was extruded by an extruder from the carbonization chamber to outside the oven. The partition surface of the carbonization chamber was thus repaired into a smooth surface, and the through-crack was repaired. Further, strength of the silica bricks and the joints thereof forming the original partition was improved.

Example 3

An example of the third embodiment will now be described with reference to FIG. 7 for a case where the partition-type heat exchanger is a coke oven.

The coke oven had the same structure and functions as those described in Example 1. Silica bricks having an open porosity of 20 vol. % were employed for the partition 10 between the carbonization chamber serving as a heated chamber 12 and the combustion chamber serving as a heating chamber 11, and the silica bricks were bound with a joint material. The partition surface on the carbonization chamber side suffered from serious cracks and surface irregularities as a result of thermal spalling or wear during coke discharge.

The coal charging cover serving as a heated material charging cover 35 is provided with a gas inlet 37 for the $SiCl_4$-containing gas, a gas exhaust port 37' and a pressure outlet 38. The coke oven gas was burned in a flue to generate a combustion gas serving as the gas G-2 (48) containing from 15 to 25 vol. % $H_2O$. On the other hand, the flue exit temperature was adjusted within a prescribed range of from 900 to 1,450° C.

After the oven was made empty by discharging coke from the carbonization chamber, the oven doors were removed. Then, deposits on the oven wall damage 49 were scraped off with an iron rod. A flame spraying nozzle was inserted in the proximity to the damaged portion 49, and a silicious flame-spray material containing Si and Al (94 wt. % $SiO_2$ and 3 wt. % $Al_2O_3$) was sprayed. This process was repeated to a plurality of damaged portions 49 to apply the flame-spray material 53 to the oven wall substrate.

After attaching the oven doors, a release valve (not shown) for releasing gases, connected to the carbonization chamber, was opened to feed $N_2$ gas. Air was thus released into the open air and the interior of the carbonization chamber was replaced with $N_2$ gas. Then, the release valve was closed. An $SiCl_4$-containing gas comprising 10 vol. % $SiCl_4$ and 90 wt. % $N_2$ was fed to the carbonization chamber through the gas inlet 37. Supply of the $SiCl_4$-containing gas was continued until the pressure difference between the carbonization chamber and the combustion chamber (carbonization chamber pressure—combustion chamber pressure), as determined by the pressure difference detecting meter 40, reached +50 mmAq, and then discontinued. The $SiCl_4$-containing gas penetrated into silica bricks serving as the substrate forming the oven wall, open pores of joints, open pores of the flame-spray material, and joint interruptions, and the pressure difference gradually decreased. When +5 mmAq was reached, the $SiCl_4$-containing gas was immediately discharged by means of an exhaust pump 52. When the pressure difference decreased from positive to negative and reached −50 mmAq, exhausting was immediately discontinued. When the pressure difference became negative, the combustion gas penetrated into the substrate of the partition 10 and the flame-spray material 53 from the combustion chamber toward the carbonization chamber. $H_2O$ contained in the combustion gas reacted with $SiCl_4$ remaining in the partition 10, thus causing precipitation of $SiO_2$. Immediately after stoppage of exhaust, the $SiCl_4$-containing gas was fed again. Feeding of $SiC_4$-containing gas was continued until the pressure difference increased from negative to positive and reached +50 mmAq, and then discontinued. In the mean time, when the pressure difference was positive, $SiCl_4$ penetrated from the carbonization chamber to the combustion chamber into the substrate of the partition 10 and the flame-spray material 53, and $SiCl_4$ reacted with $H_2O$ remaining in the substrate of the partition 10 and the flame-spray material 53, causing precipitation of $SiO_2$. This process was repeated.

The period of time required for a cycle of the process increased according as the quantity of $SiO_2$ accumulated in the substrate of the partition 10 and the flame-spray material 53 increased. Initially, it was for three minutes per cycle, but for 40 minutes per cycle after the lapse of seven hours. This suggested that accumulation of $SiO_2$ proceeded smoothly, and the open pores were approaching the closed state after the lapse of seven hours. The operation was therefore discontinued upon the lapse of seven hours.

The precipitated $SiO_2$ served as a binder and improved strength, adhesion and heat conductivity of the substrate (silica bricks and joint material) forming the partition 10 and the flame-spray material.

Example 4

An example 4 covers a laboratory-scale application of the invention, in which an artificial through-crack was filled up with a metal compound precipitating through a reaction between a gas (G-1) and another gas (G-2). $Al_2O_6$ gas was used as a metal compound contained in the gas (G-1), and $CO_2$ was used as the other gas (G-2).

Figure 8:
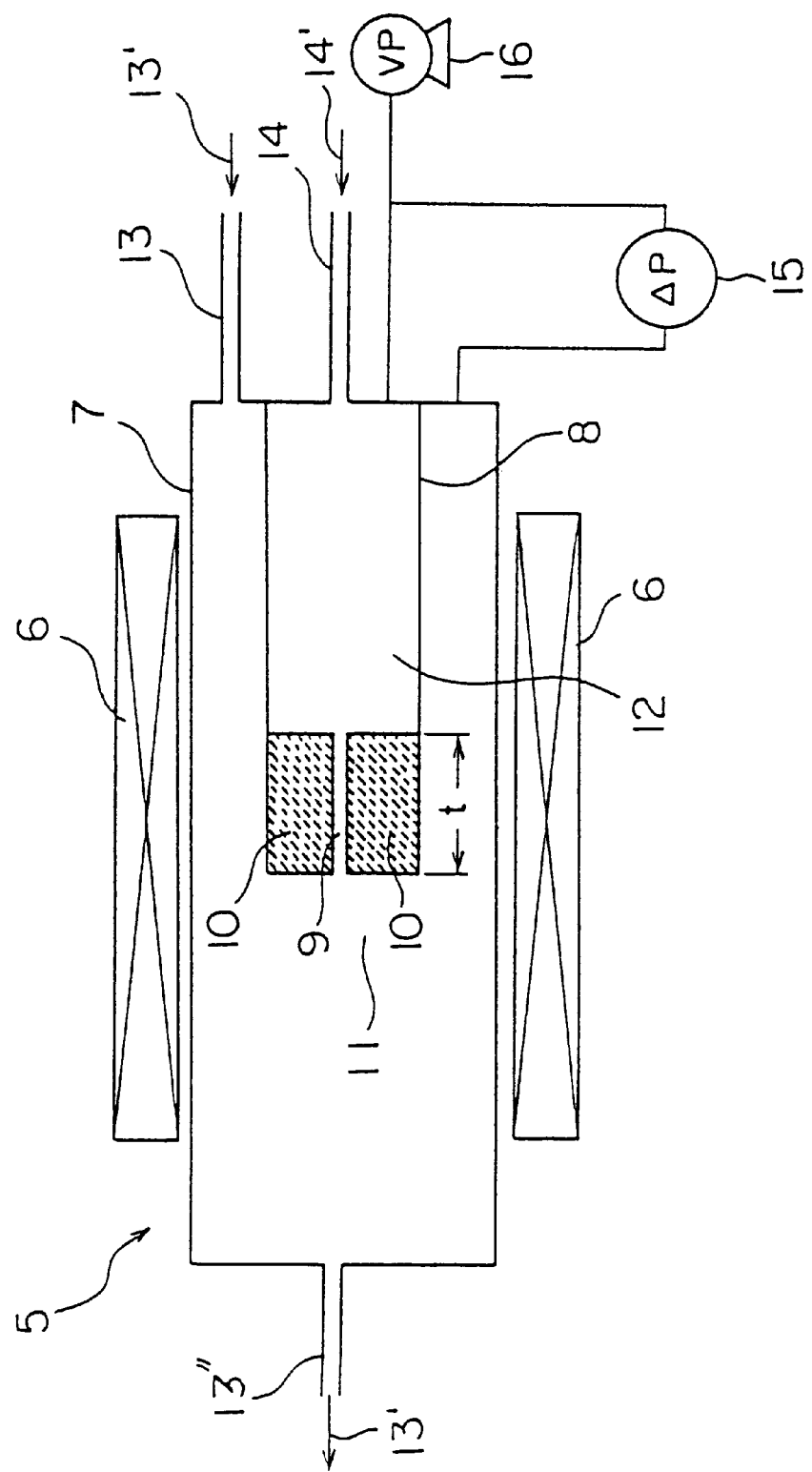
FIG. 8 is a schematic longitudinal sectional view of an apparatus used in Example 4 of the invention.

FIG. 8 is a schematic longitudinal sectional view of an apparatus used in Example 4. This apparatus is for carrying out a simulation test on a partition, a heating chamber and a heated chamber of a heat exchanger. As shown in FIG. 8, an outer quartz tube 7 was arranged in the interior of a tubular heating member 6, and an inner quartz tube 8 was arranged therein, forming a heating chamber 11 and a heated chamber 12 of the heat exchanger. A feeding port 14 of a gas 14' containing a metal compound for repairing the through-crack was provided at an end of the inner quartz tube 8, and a partition 10 was provided at the other end thereof. On the other hand, the partition 10 was prepared with a high-alumina bricks (93 wt. % $Al_2O_3$ and 3 wt. % $SiO_2$) with a thickness t of the partition 10 of 100 mm. A slit-shaped artificial through-crack 9 with a gap of 1 mm was provided at half of the height of the partition 10. A pressure difference meter 15 for measuring a pressure difference between the heated chamber 12 and the heating chamber 11 (obtained by subtracting the heating chamber pressure from the heated chamber pressure) with the partition 10 in between was attached. A vacuum pump 16 for adjusting the aforementioned pressure difference by reducing the pressure in the heated chamber 12 was connected to an end of the heated chamber 12 with a piping. A feeding port 13 of a gas 13' containing a reactive gas was provided at an end of the outer quartz tube 7, and a discharge port 13" of this gas, at the other end thereof.

In this embodiment, the oven temperature was raised to 900° C. by feeding power to the tubular heating furnace 5 while keeping a pressure difference of 0 mmAq between the heating chamber and the heated chamber, and while feeding $CO_2$ gas from the feeding port 13 of the gas 13' containing a reactive gas, and $H_2$ gas from the feeding port 14 of the gas 14' containing a metal compound, respectively. Then, $H_2$ fed from the feeding port 14 of the gas 14' containing the metal compound was switched over to a mixed gas comprising 10 vol. % $Al_2Cl_6$ and 90 vol. % $H_2$ preheated to 350° C. This $Al_2Cl_6$ had been generated by evaporating by heating powdery $AlCl_3$.

Then, $Al_2O_3$ was caused to settle in the artificial through-crack 9 by a process comprising the following steps (1) to (3):

(1) feeding the gas 14' containing the metal compound until a pressure difference of 10 mmAq is reached, and then discontinuing feeding;

(2) when the pressure difference decreases to 1 mmAq, sucking the atmosphere in the heated chamber 12 with a pressure difference adjusting vacuum pump 16, and upon reaching −10 mmAq, stopping the vacuum pump 16;

(3) holding the same for five minutes after stoppage of the vacuum pump 16 as it is, and then returning to step (1).

The aforementioned process was repeated for seven hours. Finally, transfer from step (1) to step (2) required 36 minutes, this suggesting achievement of a state of substantial closure. Then, operation of the apparatus was discontinued, and after leaving it to cool, the condition of the partition was checked up. It exhibited a perfect closed state, to judge from the exterior view.

Example 5

A fifth example covers a laboratory-scale application of the invention in which an artificial through-crack was filled up with a metal compound precipitating as a result of reaction between a gas (G-1) and another gas (G-2): Mg was employed as the metal contained in the gas (G-1), and air was used as the other gas (G-2).

Figure 9:
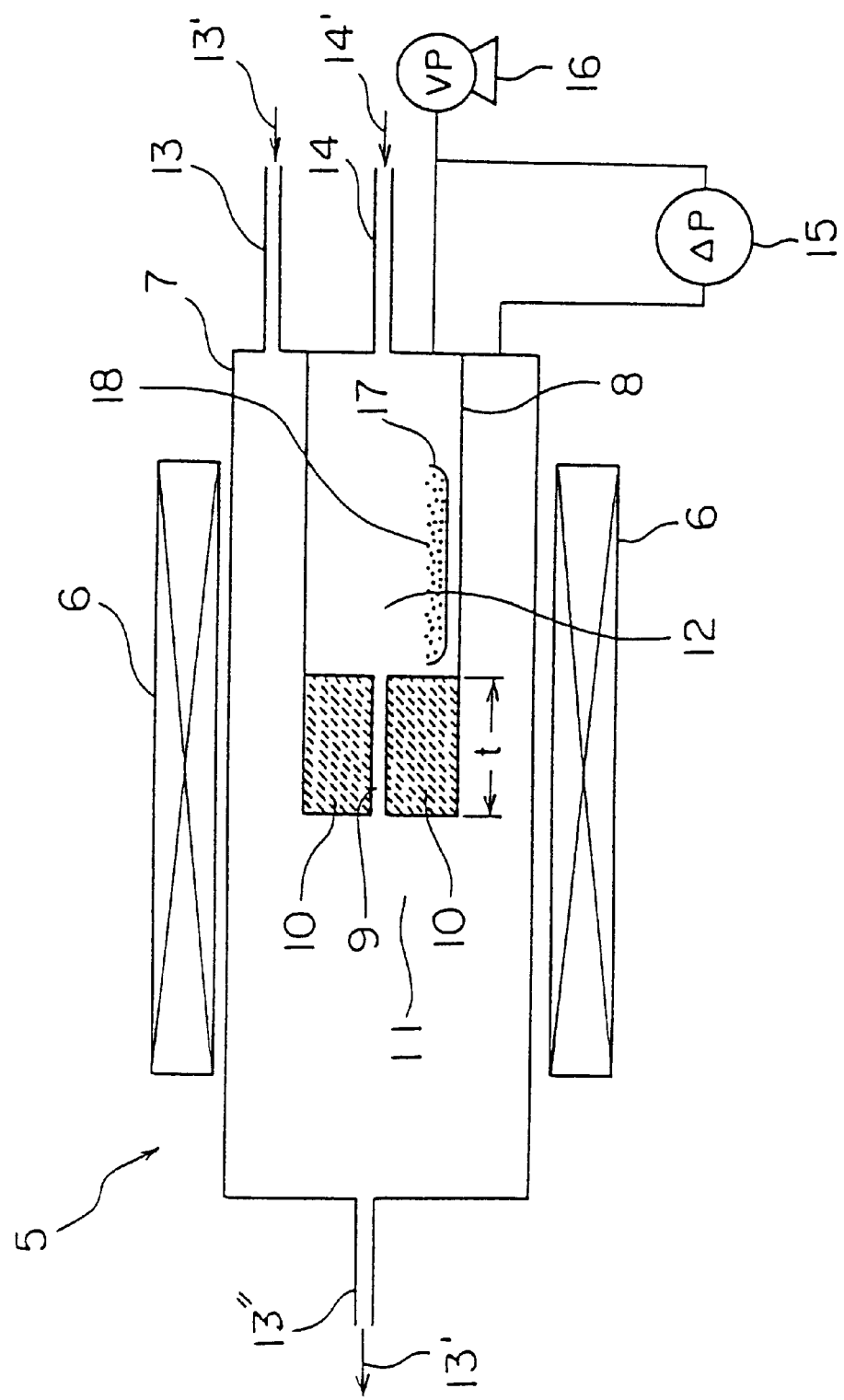
FIG. 9 is a schematic longitudinal sectional view of an apparatus used in Example 5 of the invention.

FIG. 9 is a schematic longitudinal sectional view of an apparatus used in Example 5. As shown in FIG. 9, an outer quartz tube 7 is provided in a tubular heating member 6, and an inner quartz tube 8 is arranged therein. A heating chamber 11 and a heated chamber 12 of a heat exchanger were provided. A feeding port 14 of the gas 14' containing the metal compound is provided at an end of the inner quartz tube 8, and a partition 10 is provided at the other end thereof. The partition 10 was made of silica bricks and had a thickness t of 100 mm. A slit-shaped artificial through-crack 9 having a gap of 1 mm was provided at half of the height of the partition 10. A pressure difference meter 15 for measuring the pressure difference between the heated chamber 12 and the heating chamber 11 (obtained by subtracting the heating chamber pressure from the heated chamber pressure) with the partition 10 in between was attached. A vacuum pump 16 for adjusting the above-mentioned pressure difference by reducing the pressure in the heated chamber 12 was connected to that end of the heated chamber 12 with piping. A feeding port 13 of a gas 13' containing a reactive gas was provided at an end of the outer quartz tube 7, and a discharge port 13'' for this gas was provided at the other end thereof.

Metal magnesium powder 18 (purity: 99.9 wt. %, particle size: 14 mesh under) in an amount of 100 g put in an alumina boat 17 was placed in the inner quartz tube 8. Then, the oven temperature was increased to 800° C. by supplying power to a tubular heating furnace 5, while keeping the pressure difference between the heating chamber and the heated chamber at 0 mmAq, and while feeding air from the feeding port 13 of the gas 13' containing the reactive gas and Ar gas from the feeding port 14 of the gas 14' containing the metal compound. Then, the Ar gas having been fed from the feeding port 14 of the gas 14' containing the metal compound was switched over to magnesium gas obtained by melting, then vaporizing and preheated to 800° C. metal magnesium as described above.

Then, MgO was caused to settle into the artificial through-crack 9 by the following process comprising the steps (1) to (3):

(1) feeding Ar gas until the pressure difference reaches 50 mmAq, and then discontinuing feeding;

(2) sucking the atmosphere in the heated chamber 12 by means of a pressure difference adjusting vacuum pump 16 when the pressure difference decreases to 1 mmAq, and stopping the vacuum pump 16 upon reaching −10 mmAq;

(3) holding the same for five minutes after stoppage of the vacuum pump 16 as it is, and then returning to step (1).

The aforementioned process was repeated for three hours. Finally, transfer from step (1) to step (2) required 42 minutes, this suggesting achievement of a state of substantial closure. Then, operation of the apparatus was discontinued, and after leaving it to cool, the condition of the partition was checked up. It exhibited a perfect closed state, to judge from the exterior view.

Example 6

An example 6 covers an application of the invention in which an artificial through-crack is provided in a partition in a small-capacity coke oven, and the artificial through-crack is closed by means of $SiO_2$ precipitated through reaction between $SiCl_4$ gas and combustion gas of the coke oven. Si was used as a metal contained in a gas (G-1), and air was used as another gas (G-2).

FIG. 10 is a schematic longitudinal sectional view of the small-capacity coke oven used in Example 6. As shown in FIG. 10, a carbonization chamber 20 having a width of 430 mm and a depth of 1,400 mm, and combustion chambers 21 provided via partitions 22a and 22b on the both sides of the carbonization chamber 20 are arranged. The carbonization chamber 20 is provided with an $SiCl_4$ evaporator 24 for generating vapor of $SiCl_4$ via piping. On the other hand, a piping 34 for feeding coke oven gas 28 and a piping 34 for feeding combustion air 29 are provided at an end of each combustion chamber 21, and a flue 31 communicating with a stack (not shown) for discharging combustion waste gas is provided at the other end of each combustion chamber 21. Further, a pressure difference meter 26 for measuring the pressure difference between the carbonization chamber 20 and the combustion chamber 21 is provided in communication with the carbonization chamber 20 and the combustion chamber 21.

The partitions 22a and 22b are made of silica bricks having a thickness of 100 mm. As shown in FIG. 10, a silica bricks 23 having a slit-shaped artificial through-crack 23' having a width of 100 mm is arranged with a gap of 1 mm on a portion of one of partition 22a.

$SiCl_4$ vapor generated in $SiCl_4$ evaporator 24 is carried by $N_2$ gas 25 serving as a carrier gas and fed through the piping 34 to the carbonization chamber 20.

Using the above-mentioned apparatus, coke oven gas 28 and combustion air 29 were fed to the combustion chamber 21, and burned in the combustion chamber 21 to keep a combustion waste gas temperature at 1,050° C. at the exit of the combustion chamber 30. The combustion waste gas was discharged through the flue 31 from the stack.

Then, $N_2$ gas 25 was fed to the carbonization chamber 20, and after replacing the atmosphere in the carbonization chamber 20 with N$_2$ gas 25, SiCl$_4$ gas was sent by N$_2$ gas from the SiCl$_4$ evaporator 24 to switch over to a mixed gas of SiCl$_4$ gas and N$_2$ gas. The mixed gas contained 10 vol. % SiCl$_4$ and 90 vol. % N$_2$.

SiO$_2$ was caused to settle in the artificial through-crack 23' through the following steps (1) to (3):

(1) feeding SiCl$_4$-containing gas to the carbonization chamber 20 until the pressure difference reaches 10 mmAq, and then discontinuing feeding;

(2) sucking the atmosphere in the carbonization chamber 20 by means of a pressure difference adjusting vacuum pump 27 when the pressure difference decreases to 1 mmAq, and stopping the vacuum pump 27 upon reaching −10 mmAq;

(3) holding the same for five minutes after stoppage of the vacuum pump 27 as it is, and then returning to step (1).

The aforementioned process was repeated for seven hours. Finally, transfer from step (1) to step (2) required 27 minutes, this suggesting achievement of a state of substantial closure. Then, operation of the apparatus was discontinued, and after leaving it to cool, the condition of the partition was checked up. It exhibited a perfect closed state, to judge from the exterior view.

Example 7

In an example 7, the same apparatus as that shown in FIG. 10 was used except that a pneumatic transfer pipe (not shown) was attached to a coal charging port cover (not shown) provided at the top of the carbonization chamber 20 of the apparatus used in Example 6. A refractory powder was fed via the carbonization chamber to the inside of an artificial through-crack by means of the above-mentioned pneumatic transfer pipe, and then, precipitated SiO$_2$ was caused to settle between particles of the refractory powder.

Example 7 will therefore be described with reference to FIG. 10 used in the description of Example 6.

Coke oven gas 28 and combustion air 29 were fed to a combustion chamber 21, where these gases were burned in the combustion chamber 21, thereby keeping the combustion gas temperature at 1,050° C. at the combustion chamber exit 30. The combustion gas passed through a flue 31 and was discharged from a stack.

First, the refractory powder(SiO$_2$: 77 wt. %. Al$_2$O$_3$: 17 wt. %, particle size: 200 mesh under) was fed by pneumatic transfer into the carbonization chamber 20 through a pneumatic transfer pipe (not shown) attached to the coal charging port cover (not shown) at the top of the carbonization chamber 20. When the pressure difference between the carbonization chamber 20 and the combustion chamber 21 reached 70 mmAq, feeding of the refractory powder was discontinued.

Then, N$_2$ gas 25 was fed to the carbonization chamber 20. On the other hand, the carbonization chamber 20 was evacuated by the use of a pressure difference adjusting vacuum pump 27 to replace the atmosphere in the carbonization chamber 20 with N$_2$ gas. Then, SiCl$_4$ gas was sent from the SiCl$_4$ evaporator 24 by means of N$_2$ gas, thereby switching over to a mixed gas of SiCl$_4$ gas and N$_2$ gas. The mixed gas comprised 10 vol. % SiCl$_4$ and 90 vol. % N$_2$.

Then, SiO$_2$ was caused to settle in the artificial through-crack 23' by the following process comprising steps (1) to (3):

(1) feeding SiCl$_4$-containing gas to the carbonization chamber 20 until the pressure difference reaches 10 mmAq, and then, discontinuing feeding;

(2) sucking the atmosphere in the carbonization chamber 20 by means of a pressure difference adjusting vacuum pump 27 when the pressure difference decreases to 1 mmAq, and stopping the vacuum pump 27 upon reaching −10 mmAq;

(3) holding the same for five minutes after stoppage of the vacuum pump 27 as it is, and then returning to step (1).

The aforementioned process was repeated for three hours. Finally, transfer from step (1) to step (2) required 44 minutes, this suggesting achievement of a state of substantial closure. Then, operation of the apparatus was discontinued, and after leaving it to cool, the condition of the partition was checked up. It exhibited a perfect closed state, to judge from the exterior view.

As described above, by filling the through-crack previously with the refractory powder prior to sending SiCl$_4$ gas into the carbonization chamber, it was possible to largely reduce the period of time necessary for settlement of SiO$_2$ performed thereafter.

Example 8

Figure 11:
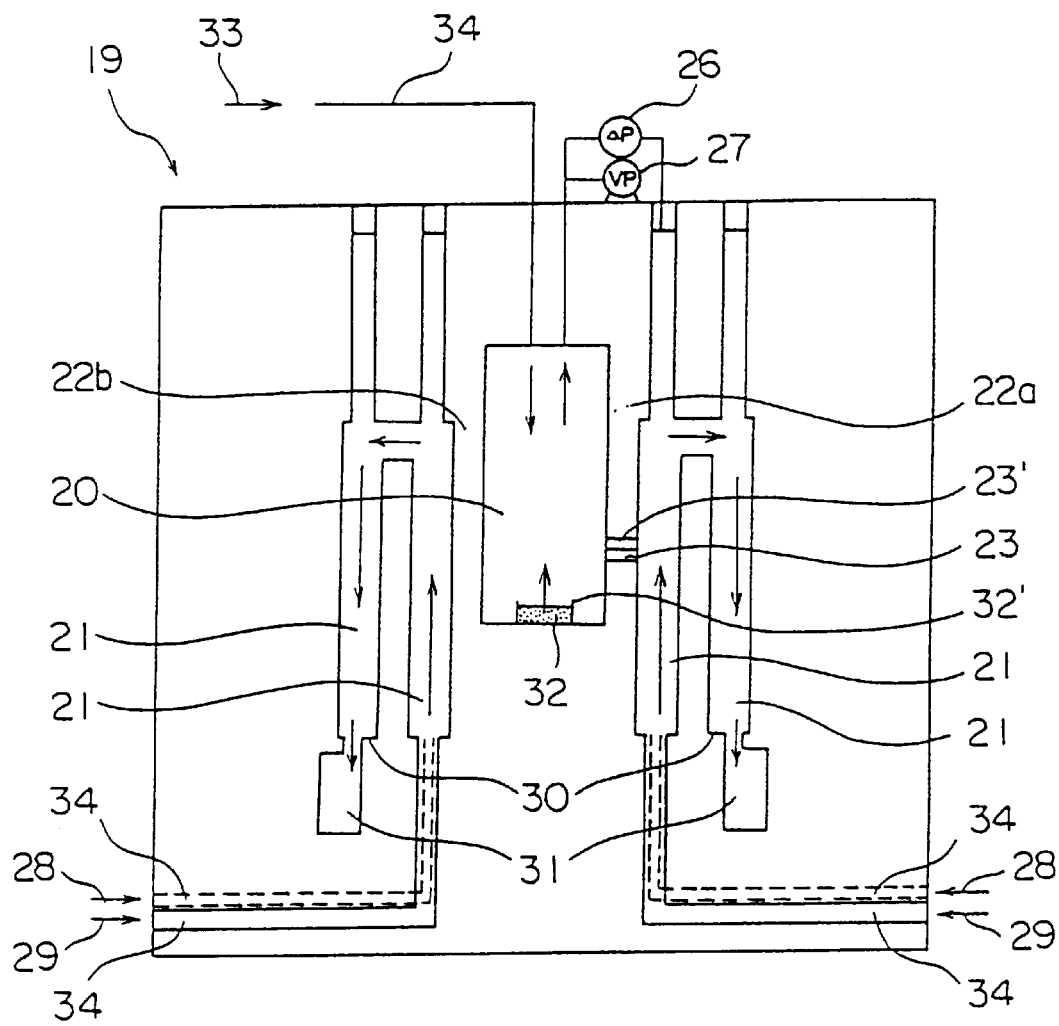
FIG. 11 is a schematic longitudinal sectional view of an apparatus used in Example 8 of the invention.

FIG. 11 is a schematic longitudinal sectional view of an apparatus used in Example 8. This apparatus was a small-capacity coke oven, and was formed by removing the SiCl$_4$ evaporator 24 from the apparatus (FIG. 10) used in Example 6, and changing N$_2$ gas 25 serving as a carrier gas for the SiCl$_4$ gas to Ar gas 33. Further, it was the same apparatus as that shown in FIG. 10 except that a pneumatic transfer pipe (not shown) was attached to the coal charging port cover (not shown) at the top of the carbonization chamber 20. Example 8 will be described with reference to FIG. 11.

Coke oven gas 28 and combustion air 29 were fed to a combustion chamber 21, where these gases were burned in the combustion chamber 21, thereby keeping the combustion gas temperature at 1,050° C. at the combustion chamber exit 30. The combustion gas passed through a flue 31 and was discharged from a stack.

First, an oven door (not shown) on the extruding side of the carbonization chamber 20 was opened, and an alumina crucible 32' containing a mixed powder 32 comprising MgO and Al (MgO: 70 wt. % and Al: 30 wt. %) in an amount of 500 g was placed in the carbonization chamber 20. Then, immediately Ar gas 33 was fed to the carbonization chamber 20. On the other hand, the atmosphere in the carbonization chamber 20 was replaced with Ar gas 33 by evacuating the carbonization chamber 20 by the use of the pressure difference adjusting vacuum pump 27.

Then, MgO was caused to settle in the artificial through-crack 23' by the following process comprising steps (1) to (3):

(1) feeding Ar gas 33 to the carbonization chamber 20 until the pressure difference reaches 10 mmAq, and then, discontinuing feeding;

(2) sucking the atmosphere in the carbonization chamber 20 by means of the pressure difference adjusting vacuum pump 27 when the pressure difference decreased to 1 mmAq, and stopping the vacuum pump 27 upon reaching −10 mmAq;

(3) holding the same for five minutes after stoppage of the vacuum pump 27 as it is, and then returning to step (1).

The aforementioned process was repeated for six hours. Finally, transfer from step (1) to step (2) required 31 minutes, this suggesting achievement of the state of substantial closure. Then, operation of the apparatus was discontinued, and after leaving it to cool, the condition of the partition was checked up. It exhibited a perfect closed state, to judge from the exterior view.

Industrial Applicability

According to the method of the invention, as described above in detail, when a flat plate is not employed, it is possible to improve strength and wear resistance of a fresh partition, for example, in the initial stage of operation of a heat exchanger and to prevent gases from flowing through a damaged portion occurring in the oven wall after starting operation. According to the method of the invention using a flat plate, there is further available an additional advantage of repairing surface irregularities caused by wear resulting from heating after start of operation into a smooth surface. In the method of the invention, furthermore, it is not necessary to specify the position of a damaged portion present in a high-temperature part upon repairing the partition, and it is possible to repair the damaged portion safely and easily without the need of operations in high-temperature environments as in the conventional art. The present invention can thus provide a method for repairing and/or reinforcing a partition of a partition-type heat exchanger, having features as described above, thus providing industrially very useful effects.

What is claimed is:

1. A method for repairing and/or reinforcing a partition of a partition-type heat exchanger, comprising the steps of:

feeding a gas (G-1) containing a metal and/or a metal compound, in a partition-type exchanger having a partition made of a material having gas permeability, to one side of said partition;

feeding another gas (G-2) containing a reactive gas precipitating a solid metal compound as a result of reaction with said metal and/or metal compound to the other side of said partition;

causing said gas (G-1) and said other gas (G-2) to reach from said one side and said other side, respectively, the interior of the partition;

then causing said gas (G-1) and said other gas (G-2) to react within said partition to generate said solid metal compound; and causing precipitation of the thus generated solid metal compound into the interior of said partition, thereby repairing and/or reinforcing the partition of the partition-type heat exchanger.

2. A method as claimed in claim 1, wherein:

said partition in said partition-type heat exchanger has a damaged portion.

3. A method as claimed in claim 1 or 2, wherein:

said metal compound comprises a metal halide.

4. A method as claimed in claim 1 or 2, wherein:

said metal comprises magnesium, and said reactive gas comprises at least one selected from the group consisting of oxygen, carbon monoxide and water.

5. A method as claimed in claim 4, wherein:

said magnesium comprises magnesium vapor generated by causing a reaction between magnesium oxide and aluminum at a temperature within a range of from 850 to 1,700° C.

6. A method as claimed in claim 1 or 2, wherein:

said partition-type heat exchanger comprises a coke oven having a carbonization chamber and a combustion chamber;

said carbonization chamber forms said one side of said partition, and said combustion chamber forms said other side of said partition;

said gas (G-1) containing said metal and/or metal compound comprises a gas containing a silicon compound, and said other gas (G-2) containing said reactive gas comprises a combustion gas generated in said combustion chamber;

the reaction between said gas (G-1) and said other gas (G-2) is caused by changing the pressure in said carbonization chamber and said combustion chamber so that the pressure difference between said carbonization chamber and said combustion chamber (carbonization chamber pressure—combustion chamber pressure) becomes alternately positive and negative; and said solid metal compound for causing precipitation in the interior of said partition comprises silicon dioxide.

7. A method as claimed in claim 2, wherein:

prior to feeding the gas (G-1) containing said metal and/or said metal compound to said one side, a preliminary repair is applied to said damaged portion.

8. A method as claimed in claim 7, wherein:

the reaction between said gas (G-1) and said other gas (G-2) is caused by changing the pressure on said one side and on said other side so that the pressure difference between said one side of the partition and said other side of the partition (pressure of said one side of the partition—pressure of said other side of the partition) becomes alternately positive and negative.

9. A method as claimed in claim 6, wherein:

said metal compound comprises a metal halide.

10. A method as claimed, in claim 7, wherein:

said metal compound comprises a metal halide.

11. A method as claimed in claim 6, wherein:

said gas (G-1) comprises a gas containing a metal; said metal comprises magnesium; and said reactive gas comprises at least one selected from the group consisting of oxygen, carbon monoxide and water.

12. A method as claimed in claim 7, wherein:

said gas (G-1) comprises a gas containing a metal;

said metal comprises magnesium; and said reactive gas comprises at least one selected from the group consisting of oxygen, carbon monoxide and water.

13. A method as claimed in claim 11, wherein:

said magnesium comprises magnesium vapor generated by causing a reaction between magnesium oxide and aluminum at a temperature within a range of from 850 to 1,700° C.

14. A method as claimed in claim 6, wherein:

said pressure difference is within a range of from −200 to +200 mmAq.

15. A method as claimed in claim 8, wherein:

said pressure difference is within a range of from −200 to +200 mmAq.

16. A method as claimed in claim 6, wherein:

said gas containing a silicon compound comprises a gas containing at least 0.1 vol. % silicon tetrachloride, and said combustion gas comprises a gas containing at least 1 vol. % water.

17. A method as claimed in claim 8, wherein:

said gas containing a silicon compound comprises a gas containing at least 0.1 vol. % silicon tetrachloride, and said combustion gas comprises a gas containing at least 1 vol. % water.

18. A method for repairing and/or reinforcing a partition of a partition-type heat exchanger, comprising the steps of:

arranging, in a heat exchanger having a partition formed of a material having gas permeability between a heated chamber and a heating chamber, a flat plate having gas permeability in the proximity to, or in partial contact with, the wall surface of said partition in said heated chamber;

filling a space formed between said wall surface and said flat plate with an inorganic powder;

then, feeding a gas (G-1) containing a metal and/or a metal compound to said heated chamber;

feeding another gas (G-2) containing a reactive gas causing precipitation of a solid metal compound through reaction with said metal and/or said metal compound to said heating chamber;

causing said gas (G-1) and said other gas (G-2) to individually reach said space filled with said inorganic powder and the interior of said partition; and then, causing said gas (G-1) to react with said other gas (G-2) in said space and said interior of said partition, thereby generating said solid metal compound between particles of said inorganic powder and in the interior of said partition.

19. A method as claimed in claim 18, wherein:

said partition in said partition-type heat exchanger has a damaged portion.

20. A method as claimed in claim 18 or 19, wherein:

said partition-type heat exchanger comprises a coke oven having a carbonization chamber and a combustion chamber;

said heated chamber comprises said carbonization chamber and said heating chamber comprises said combustion chamber;

said gas (G-1) containing said metal and/or metal compound comprises a gas containing a silicon compound, and said other gas (G-2) containing said reactive gas comprises a combustion gas generated in said combustion chamber;

the reaction between said gas (G-1) and said other gas (G-2) is caused by changing the pressure in said carbonization chamber and said combustion chamber so that the pressure difference between said carbonization chamber and said combustion chamber (carbonization chamber pressure—combustion chamber pressure) becomes alternately positive and negative; and said solid metal compound for causing precipitation in the interior of said partition comprises silicon dioxide.

21. A method as claimed in claim 19, wherein:

prior to feeding the gas (G-1) containing said metal and/or said metal compound to said one side, a preliminary repair is applied to said damaged portion.

22. A method as claimed in claim 21, wherein:

the reaction between said gas (G-1) and said other gas (G-2) is caused by changing the pressure in said carbonization chamber and said combustion chamber so that the pressure difference between said carbonization chamber and said combustion chamber (carbonization chamber pressure—combustion chamber pressure) becomes alternately positive and negative.

23. A method as claimed in claim 20, wherein:

said pressure difference is within a range of from −200 to +200 mmAq.

24. A method as claimed in claim 22, wherein:

said pressure difference is within a range of from −200 to +200 mmAq.

25. A method as claimed in claim 20, wherein:

said gas containing a silicon compound comprises a gas containing at least 0.1 vol. % silicon tetrachloride, and said combustion gas comprises a gas containing at least 1 vol. % water.

26. A method as claimed in claim 22, wherein:

said gas containing a silicon compound comprises a gas containing at least 0.1 vol. % silicon tetrachloride, and said combustion gas comprises a gas containing at least 1 vol. % water.

27. A method as claimed in claim 12, wherein:

said magnesium comprises magnesium vapor generated by causing a reaction between magnesium oxide and aluminum at a temperature within a range of from 850 to 1,700° C.

* * * * *